(12) United States Patent
Li et al.

(10) Patent No.: US 11,044,730 B2
(45) Date of Patent: Jun. 22, 2021

(54) MULTIPLE SEMI-PERSISTENT SCHEDULED TRANSMISSION CONTROL BY A SINGLE DOWNLINK CONTROL INFORMATION MESSAGE

(71) Applicant: QUALCOMM incorporated, San Diego, CA (US)

(72) Inventors: Junyi Li, Chester, NJ (US); Vinay Joseph, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/581,066

(22) Filed: Sep. 24, 2019

(65) Prior Publication Data

US 2020/0100252 A1 Mar. 26, 2020

Related U.S. Application Data

(60) Provisional application No. 62/736,169, filed on Sep. 25, 2018.

(51) Int. Cl.
*H04W 72/04* (2009.01)
*H04L 1/16* (2006.01)
(Continued)

(52) U.S. Cl.
CPC ....... *H04W 72/0493* (2013.01); *H04L 1/0005* (2013.01); *H04L 1/1614* (2013.01);
(Continued)

(58) Field of Classification Search
CPC .......... H04W 72/0493; H04W 72/042; H04W 72/0466; H04W 72/1226; H04W 4/005;
(Continued)

(56) References Cited

U.S. PATENT DOCUMENTS

2014/0105164 A1* 4/2014 Moulsley .......... H04W 72/1289
370/329
2016/0183290 A1* 6/2016 Ko ...................... H04W 52/365
370/329
(Continued)

FOREIGN PATENT DOCUMENTS

WO WO-2018082985 A2 5/2018

OTHER PUBLICATIONS

International Search Report and Written Opinion—PCT/US2019/052859—ISA/EPO—dated Dec. 11, 2019.
(Continued)

*Primary Examiner* — Jung Liu
(74) *Attorney, Agent, or Firm* — Holland & Hart LLP

(57) ABSTRACT

Methods, systems, and devices for wireless communications are described. A UE may be configured to transmit more than one set of semi-persistent scheduled (SPS) transmissions to a base station. The base station may indicate, within the configuration, a group of SPS transmission sets. The base station may determine to reconfigure one or more of the SPS transmission sets (e.g., due to a change in channel conditions). The base station may indicate an updated configuration for the more than one SPS transmission sets via a single downlink control information (DCI) message. In some cases, the more than one SPS transmission sets corresponds to the group of SPS transmission sets. After receiving the updated configuration for the SPS transmissions sets, the UE may adjust the SPS configurations accordingly and communicate with the base station using the adjusted configurations.

30 Claims, 17 Drawing Sheets

(51) Int. Cl.
*H04W 76/11* (2018.01)
*H04L 1/00* (2006.01)

(52) U.S. Cl.
CPC ..... *H04W 72/042* (2013.01); *H04W 72/0466* (2013.01); *H04W 76/11* (2018.02)

(58) Field of Classification Search
CPC ....... H04W 72/14; H04W 88/08; H04W 4/70; H04W 84/18; H04W 72/121; H04W 76/11; H04W 72/04; H04L 1/1812; H04L 5/0048; H04L 5/0082; H04L 5/0094; H04L 1/1614; H04L 1/0005; H04L 1/0025; Y02D 70/24; Y02D 70/1262; Y02D 70/23; Y02D 70/21
See application file for complete search history.

(56) References Cited

U.S. PATENT DOCUMENTS

| | | | |
|---|---|---|---|
| 2017/0208612 A1* | 7/2017 | Tushar | H04W 72/14 |
| 2018/0041997 A1* | 2/2018 | Babaei | H04W 48/16 |
| 2018/0048994 A1* | 2/2018 | Kwon | H04W 64/006 |
| 2019/0021085 A1* | 1/2019 | Mochizuki | H04W 52/0203 |
| 2019/0104515 A1* | 4/2019 | Li | H04W 72/0413 |
| 2020/0022174 A1* | 1/2020 | Karaki | H04W 72/1284 |
| 2020/0137769 A1* | 4/2020 | Sun | H04W 72/1242 |
| 2020/0305167 A1* | 9/2020 | Freda | H04L 1/1642 |

OTHER PUBLICATIONS

Lenovo: "Discussion on DCI Design to Support Multiple SPS Configurations", 3GPP TSG RAN WG1 Meeting #86bis, 3GPP Draft; R1-1609401, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 9, 2016 (Oct. 9, 2016), 3 pages, XP051149444, Retrieved from the Internet: URL: http://www.3gpp.org/ftp/Meetings_3GPP_SYNC/RAN1/Docs/ [retrieved on Oct. 9, 2016] paragraph [0002]—paragraph [0003].
LG Electronics: "Remaining Details of UE Procedure for Sidelink and Uplink SPS", 3GPP TSG RAN WG1 Meeting #86bis, 3GPP Draft; R1-1609181 Remaining Details of UE Procedure for Sidelink and Uplink SPS_LG, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 9, 2016 (Oct. 9, 2016), pp. 1-3, XP051149227, Retrieved from the Internet: URL: http://www.3gpp.org/ftp/Meetings_3GPP_SYNC/RAN1/Docs/ [retrieved on Oct. 9, 2016] paragraph [02.1].
NTT Docomo: "Multiple SPS Support for Sidelink and Uplink V2X", 3GPP TSG RAN WG1 Meeting #86bis, 3GPP Draft; R1-1610037 LTE V2X SPS, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 9, 2016 (Oct. 9, 2016), pp. 1-5, XP051150062, Retrieved from the Internet: URL: http://www.3gpp.org/ftp/Meetings_3GPP_SYNC/RAN1/Docs/ [retrieved on Oct. 9, 2016] paragraph [0002], p. 4.

* cited by examiner

MULTIPLE SEMI-PERSISTENT SCHEDULED TRANSMISSION CONTROL BY A SINGLE DOWNLINK CONTROL INFORMATION MESSAGE

CROSS REFERENCE

The present Application for Patent claims the benefit of U.S. Provisional Patent Application No. 62/736,169 by LI et al., entitled "MULTIPLE SEMI-PERSISTENT SCHEDULED TRANSMISSION CONTROL BY A SINGLE DOWNLINK CONTROL INFORMATION MESSAGE," filed Sep. 25, 2018, assigned to the assignee hereof, and expressly incorporated herein.

BACKGROUND

The following relates generally to wireless communications, and more specifically to multiple semi-persistent scheduled (SPS) transmission control by a single downlink control information (DCI) message.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency-division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, traffic may be transmitted between a base station and a UE based on a periodic schedule. Accordingly, the base station may transmit information in a downlink control channel to the UE to indicate upcoming downlink traffic or to indicate resources for upcoming uplink traffic. Transmitting this scheduling information each time the periodic traffic is identified may increase signaling overhead for the base station and UE (e.g., increased latency, overhead power consumption at the UE, etc.). To reduce the signaling overhead, the base station may transmit a configuration for autonomous transmissions (e.g., an SPS configuration) to the UE that allocates resources occurring periodically to be used autonomously for the periodic traffic. Efficient techniques are desired for configuring autonomous transmissions while reducing signaling overhead.

SUMMARY

The described techniques relate to improved methods, systems, devices, and apparatuses that support multiple autonomous transmission control by a single downlink control information (DCI) message. Generally, the described techniques provide for configuring autonomous transmissions (e.g., semi-persistent scheduled (SPS) transmissions, configured grants (CGs)) such that a single DCI message may indicate a reconfiguration for more than one set of SPS transmissions. In some cases, the configuration may include a base station indicating a group including more than one set of SPS transmissions such that the single DCI message reconfigures each of the sets of SPS transmissions within the group. The configuration may further include an indication of a group radio network temporary identifier (RNTI) corresponding to the group of sets of SPS transmissions. Here, a UE may determine that the DCI message indicates a reconfiguration for multiple SPS transmission sets based on successfully decoding the DCI message using the group RNTI. The UE may then adjust the configurations of multiple sets of SPS transmissions based on the single DCI message. The techniques may provide a more efficient and lower latency method for reconfiguring more than one set of SPS transmissions (e.g., when compared to a DCI message reconfiguring only a single set of SPS transmissions).

A method of wireless communication at a UE is described. The method may include receiving, from a base station, a first configuration for a first set of SPS transmissions with the base station and a second configuration for a second set of SPS transmissions with the base station, receiving, from the base station, an indication within a DCI message that identifies both the first configuration and the second configuration and indicates that at least one of the first configuration and the second configuration is to be updated, adjusting at least one of the first configuration and the second configuration according to the indication included within the DCI message, and communicating with the base station via the first set of SPS transmissions using the first configuration and via the second set of SPS transmissions using the second configuration, where at least one of the first configuration or the second configuration is adjusted in accordance with the indication.

An apparatus for wireless communication at a UE is described. The apparatus may include a processor, memory coupled with the processor, and instructions stored in the memory. The instructions may be executable by the processor to cause the apparatus to receive, from a base station, a first configuration for a first set of SPS transmissions with the base station and a second configuration for a second set of SPS transmissions with the base station, receive, from the base station, an indication within a DCI message that identifies both the first configuration and the second configuration and indicates that at least one of the first configuration and the second configuration is to be updated, adjust at least one of at least one of the first configuration and the second configuration according to the indication included within the DCI message, and communicate with the base station via the first set of SPS transmissions using the first configuration and via the second set of SPS transmissions using the second configuration, where at least one of the first configuration or the second configuration is adjusted in accordance with the indication.

Another apparatus for wireless communication at a UE is described. The apparatus may include means for receiving, from a base station, a first configuration for a first set of SPS transmissions with the base station and a second configuration for a second set of SPS transmissions with the base station, receiving, from the base station, an indication within a DCI message that identifies both the first configuration and the second configuration and indicates that at least one of the first configuration and the second configuration is to be updated, adjusting at least one of at least one of the first configuration and the second configuration according to the indication included within the DCI message, and communicating with the base station via the first set of SPS transmissions using the first configuration and via the second set of SPS transmissions using the second configuration, where at least one of the first configuration or the second configuration is adjusted in accordance with the indication.

A non-transitory computer-readable medium storing code for wireless communication at a UE is described. The code may include instructions executable by a processor to receive, from a base station, a first configuration for a first set of SPS transmissions with the base station and a second configuration for a second set of SPS transmissions with the base station, receive, from the base station, an indication within a DCI message that identifies both the first configuration and the second configuration and indicates that at least one of the first configuration and the second configuration is to be updated, adjust at least one of at least one of the first configuration and the second configuration according to the indication included within the DCI message, and communicate with the base station via the first set of SPS transmissions using the first configuration and via the second set of SPS transmissions using the second configuration, where at least one of the first configuration or the second configuration is adjusted in accordance with the indication.

Some examples of the method, apparatuses, and non-transitory computer-readable medium described herein may further include operations, features, means, or instructions for receiving, from the base station, a grouping indication that indicates that the first set of SPS transmissions and the second set of SPS transmissions may be in a configuration group, where the indication that identifies both the first configuration and the second configuration indicates that both the first configuration and the second configuration are to be updated based on the first set of SPS transmissions and the second set of SPS transmissions being in a same configuration group.

In some examples of the method, apparatuses, and non-transitory computer-readable medium described herein, receiving the indication with the DCI message may include operations, features, means, or instructions for receiving a bitmap which indicates updates to the first configuration and the second configuration.

In some examples of the method, apparatuses, and non-transitory computer-readable medium described herein, receiving the indication with the DCI message may include operations, features, means, or instructions for receiving, in the DCI message, a first indication and a corresponding first identifier associated with the first configuration and receiving, in the DCI message, a second indication and a corresponding second identifier associated with the second configuration.

In some examples of the method, apparatuses, and non-transitory computer-readable medium described herein, receiving the indication with the DCI message may include operations, features, means, or instructions for receiving a first reconfiguration indication within a first field of the DCI message and receiving a second reconfiguration message within a second field of the DCI message that may be different from the first field.

In some examples of the method, apparatuses, and non-transitory computer-readable medium described herein, receiving the indication with the DCI message may include operations, features, means, or instructions for receiving a single reconfiguration indication within a field of the DCI message which indicates updates to the first configuration and the second configuration.

Some cases of the method, apparatuses, and non-transitory computer-readable medium described herein may further include operations, features, means, or instructions for deactivating at least one of the first configuration and the second configuration according to the indication, where the adjusting is based on deactivating at least one of the first configuration and the second configuration.

In some examples of the method, apparatuses, and non-transitory computer-readable medium described herein, the indication includes a value by which both the first configuration and the second configuration may be to be adjusted.

Some examples of the method, apparatuses, and non-transitory computer-readable medium described herein may further include operations, features, means, or instructions for identifying the value from the indication, where the value may be an updated base time offset, adapting a first time offset corresponding to the first set of SPS transmissions by adding the updated base time offset to an initial first time offset associated with the first configuration and adapting a second time offset corresponding to the second set of SPS transmissions by adding the updated base time offset to an initial second time offset associated with the second configuration.

Some examples of the method, apparatuses, and non-transitory computer-readable medium described herein may further include operations, features, means, or instructions for identifying the value from the indication, where the value may be an updated base frequency offset, adapting a first frequency offset corresponding to the first set of SPS transmissions by adding the updated base frequency offset to an initial first frequency offset associated with the first configuration and adapting a second frequency offset corresponding to the second set of SPS transmissions by adding the updated base frequency offset to an initial second frequency offset associated with the second configuration.

Some examples of the method, apparatuses, and non-transitory computer-readable medium described herein may further include operations, features, means, or instructions for identifying the value from the indication, where the value may be an updated base bandwidth allocation, adapting a first bandwidth allocation corresponding to the first set of SPS transmissions by adding the updated base bandwidth allocation to an initial first bandwidth allocation associated with the first configuration and adapting a second bandwidth allocation corresponding to the second set of SPS transmissions by adding the updated base bandwidth allocation to an initial second bandwidth allocation associated with the second configuration.

Some examples of the method, apparatuses, and non-transitory computer-readable medium described herein may further include operations, features, means, or instructions for identifying the value from the indication, where the value may be an updated modulation and coding scheme indication, adapting a first modulation and coding scheme corresponding to the first set of SPS transmissions by adding the updated modulation and coding scheme indication to an initial modulation and coding scheme indication associated with the first configuration and adapting a second modulation and coding scheme corresponding to the second set of SPS transmissions by adding the updated modulation and coding scheme indication to an initial modulation and coding scheme indication associated with the second configuration.

Some examples of the method, apparatuses, and non-transitory computer-readable medium described herein may further include operations, features, means, or instructions for descrambling the DCI message using a group RNTI and identifying that the DCI message includes the indication that identifies both the first configuration and the second configuration based on the group RNTI used to descramble the DCI message.

In some examples of the method, apparatuses, and non-transitory computer-readable medium described herein, the group RNTI may be a cell RNTI (C-RNTI).

Some examples of the method, apparatuses, and non-transitory computer-readable medium described herein may further include operations, features, means, or instructions for receiving a first RNTI with the first configuration, receiving a second RNTI with the second configuration and determining the group RNTI as a function of the first RNTI and the second RNTI.

Some examples of the method, apparatuses, and non-transitory computer-readable medium described herein may further include operations, features, means, or instructions for receiving, with the first configuration and the second configuration, one or more RNTIs and selecting the group RNTI from the one or more RNTIs.

In some examples of the method, apparatuses, and non-transitory computer-readable medium described herein, a configuration for a set of SPS transmissions may be indicative of one or more of a set of resource blocks, a time offset, a periodicity, or a modulation and coding scheme associated with the set of SPS transmissions.

In some examples of the method, apparatuses, and non-transitory computer-readable medium described herein, receiving the indication within the DCI message further may include operations, features, means, or instructions for receiving the DCI message via a physical downlink control channel.

A method of wireless communication at a base station is described. The method may include transmitting, to a UE, a first configuration for a first set of SPS transmissions with the base station and a second configuration for a second set of SPS transmissions with the base station, transmitting, to the UE, an indication within a DCI message that identifies both the first configuration and the second configuration and indicates that at least one of the first configuration and the second configuration is to be updated, adjusting at least one of the first configuration and the second configuration according to the indication included within the DCI message, and communicating with the UE via the first set of SPS transmissions using the first configuration and via the second set of SPS transmissions using the second configuration, where at least one of the first configuration or the second configuration is adjusted in accordance with the indication.

An apparatus for wireless communication at a base station is described. The apparatus may include a processor, memory coupled with the processor, and instructions stored in the memory. The instructions may be executable by the processor to cause the apparatus to transmit, to a UE, a first configuration for a first set of SPS transmissions with the base station and a second configuration for a second set of SPS transmissions with the base station, transmit, to the UE, an indication within a DCI message that identifies both the first configuration and the second configuration and indicates that at least one of the first configuration and the second configuration is to be updated, adjust at least one of the first configuration and the second configuration according to the indication included within the DCI message, and communicate with the UE via the first set of SPS transmissions using the first configuration and via the second set of SPS transmissions using the second configuration, where at least one of the first configuration or the second configuration is adjusted in accordance with the indication.

Another apparatus for wireless communication at a base station is described. The apparatus may include means for transmitting, to a UE, a first configuration for a first set of SPS transmissions with the base station and a second configuration for a second set of SPS transmissions with the base station, transmitting, to the UE, an indication within a DCI message that identifies both the first configuration and the second configuration and indicates that at least one of the first configuration and the second configuration is to be updated, adjusting at least one of the first configuration and the second configuration according to the indication included within the DCI message, and communicating with the UE via the first set of SPS transmissions using the first configuration and via the second set of SPS transmissions using the second configuration, where at least one of the first configuration or the second configuration is adjusted in accordance with the indication.

A non-transitory computer-readable medium storing code for wireless communication at a base station is described. The code may include instructions executable by a processor to transmit, to a UE, a first configuration for a first set of SPS transmissions with the base station and a second configuration for a second set of SPS transmissions with the base station, transmit, to the UE, an indication within a DCI message that identifies both the first configuration and the second configuration and indicates that at least one of the first configuration and the second configuration is to be updated, adjust at least one of the first configuration and the second configuration according to the indication included within the DCI message, and communicate with the UE via the first set of SPS transmissions using the first configuration and via the second set of SPS transmissions using the second configuration, where at least one of the first configuration or the second configuration is adjusted in accordance with the indication.

Some examples of the method, apparatuses, and non-transitory computer-readable medium described herein may further include operations, features, means, or instructions for transmitting, to the UE, a grouping indication that indicates that the first set of SPS transmissions and the second set of SPS transmissions may be in a configuration group, where the indication that identifies both the first configuration and the second configuration indicates that both the first configuration and the second configuration are to be updated based on the first set of SPS transmissions and the second set of SPS transmissions being in a same configuration group.

In some examples of the method, apparatuses, and non-transitory computer-readable medium described herein, transmitting the indication with the DCI message may include operations, features, means, or instructions for transmitting a bitmap which indicates updates to the first configuration and the second configuration.

In some examples of the method, apparatuses, and non-transitory computer-readable medium described herein, transmitting the indication with the DCI message may include operations, features, means, or instructions for transmitting, in the DCI message, a first indication and a corresponding first identifier associated with the first configuration and transmitting, in the DCI message, a second indication and a corresponding second identifier associated with the second configuration.

In some examples of the method, apparatuses, and non-transitory computer-readable medium described herein, transmitting the indication with the DCI message may include operations, features, means, or instructions for transmitting a first reconfiguration indication within a first field of the DCI message and transmitting a second reconfiguration message within a second field of the DCI message that may be different from the first field.

In some examples of the method, apparatuses, and non-transitory computer-readable medium described herein, transmitting the indication with the DCI message may include operations, features, means, or instructions for transmitting a single reconfiguration indication within a field of the DCI message which indicates updates to the first configuration and the second configuration.

In some examples of the method, apparatuses, and non-transitory computer-readable medium described herein, the indication includes a value by which both the first configuration and the second configuration may be to be adjusted.

Some examples of the method, apparatuses, and non-transitory computer-readable medium described herein may further include operations, features, means, or instructions for transmitting the value within the indication, where the value may be an updated base time offset, adapting a first time offset corresponding to the first set of SPS transmissions by adding the updated base time offset to an initial first time offset associated with the first configuration and adapting a second time offset corresponding to the second set of SPS transmissions by adding the updated base time offset to an initial second time offset associated with the second configuration.

Some examples of the method, apparatuses, and non-transitory computer-readable medium described herein may further include operations, features, means, or instructions for transmitting the value from the indication, where the value may be an updated base frequency offset, adapting a first frequency offset corresponding to the first set of SPS transmissions by adding the updated base frequency offset to an initial first frequency offset associated with the first configuration and adapting a second frequency offset corresponding to the second set of SPS transmissions by adding the updated base frequency offset to an initial second frequency offset associated with the second configuration.

Some examples of the method, apparatuses, and non-transitory computer-readable medium described herein may further include operations, features, means, or instructions for transmitting the value from the indication, where the value may be an updated base bandwidth allocation, adapting a first bandwidth allocation corresponding to the first set of SPS transmissions by adding the updated base bandwidth allocation to an initial first bandwidth allocation associated with the first configuration and adapting a second bandwidth allocation corresponding to the second set of SPS transmissions by adding the updated base bandwidth allocation to an initial second bandwidth allocation associated with the second configuration.

Some examples of the method, apparatuses, and non-transitory computer-readable medium described herein may further include operations, features, means, or instructions for transmitting the value from the indication, where the value may be an updated modulation and coding scheme indication, adapting a first modulation and coding scheme corresponding to the first set of SPS transmissions by adding the updated modulation and coding scheme indication to an initial modulation and coding scheme indication associated with the first configuration and adapting a second modulation and coding scheme corresponding to the second set of SPS transmissions by adding the updated modulation and coding scheme indication to an initial modulation and coding scheme indication associated with the second configuration.

Some examples of the method, apparatuses, and non-transitory computer-readable medium described herein may further include operations, features, means, or instructions for scrambling the DCI message using a group RNTI, where using the group RNTI to scramble the DCI message indicates that the DCI message includes the indication that identifies both the first configuration and the second configuration.

In some examples of the method, apparatuses, and non-transitory computer-readable medium described herein, the group RNTI may be a C-RNTI.

Some examples of the method, apparatuses, and non-transitory computer-readable medium described herein may further include operations, features, means, or instructions for determining the group RNTI as a function of a first RNTI and a second RNTI, transmitting the first RNTI with the first configuration and transmitting the second RNTI with the second configuration.

Some examples of the method, apparatuses, and non-transitory computer-readable medium described herein may further include operations, features, means, or instructions for selecting the group RNTI from the one or more RNTIs and transmitting, with either the first configuration or the second configuration, one or more RNTIs.

In some examples of the method, apparatuses, and non-transitory computer-readable medium described herein, a configuration for a set of SPS transmissions may be indicative of one or more of a set of resource blocks, a time offset, a periodicity, or a modulation and coding scheme associated with the set of SPS transmissions.

In some examples of the method, apparatuses, and non-transitory computer-readable medium described herein, transmitting the indication within the DCI message further may include operations, features, means, or instructions for transmitting the DCI message via a physical downlink control channel (PDCCH).

DETAILED DESCRIPTION

Figure 1:
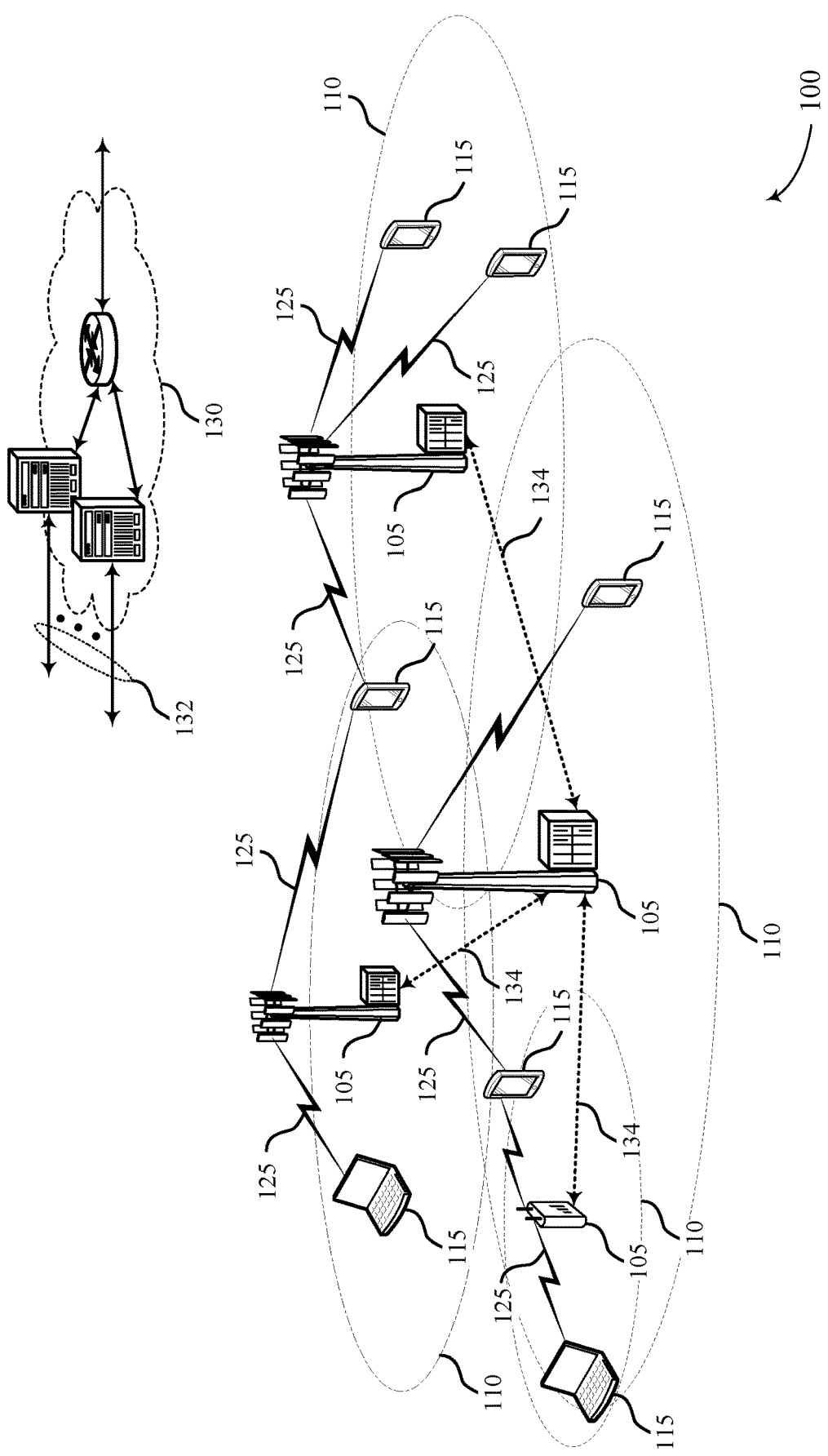
FIG. 1 illustrates an example of a system for wireless communications that supports multiple autonomous transmission control by a single downlink control information (DCI) message in accordance with aspects of the present disclosure.

In some wireless communications systems, a base station and a user equipment (UE) may communicate periodically. For example, factory automation may involve carrying periodic traffic between a programmable logic controller (PLC) and a sensor-plus-actuator (S/A) (e.g., via communications between a base station and a UE). The periodic wireless traffic communicated within a factory automation setting may be subject to strict latency and reliability requirements (e.g., the traffic may be ultra-reliable low latency communication (URLLC) traffic). Rather than sending dynamic grants each time the periodic traffic is present, which may include large signaling overhead detrimental to URLLC requirements, the base station may configure semi-persistent scheduled (SPS) transmissions, configured scheduling (CS), or a configured grant (CG) scheme to schedule resources semi-statically that may be used for the periodic traffic (e.g., autonomous transmission configuration), where SPS, CS, and CG may each be used interchangeably. However, the channel conditions for a set of SPS transmissions (e.g., transmissions made according to a single SPS scheme) may change, resulting in a need to reconfigure the SPS transmission. In the case that a single UE is relaying more than one SPS transmission between one or more PLCs and one or more S/As, the overhead accrued with reconfiguration messages may introduce latency into the system. To decrease the overhead while enabling the base station to make reconfigurations as dictated by the changed channel conditions, the base station may transmit a single downlink control information (DCI) message to the UE indicating a reconfiguration for multiple sets of SPS transmissions.

The base station may configure the sets of SPS transmissions to enable the single DCI message to indicate a reconfiguration for multiple sets of SPS transmissions. In some cases, the configuration may include a base station indicating a group including more than one set of SPS transmissions where the single DCI message reconfigures each of the sets of SPS transmissions within the group. The configuration may further include an indication of a group radio network temporary identifier (RNTI) corresponding to the group of sets of SPS transmissions. Here, a UE may determine that the DCI message indicates a reconfiguration for multiple SPS transmission sets based on successfully decoding the DCI message using the group RNTI. The UE may then adjust the configurations of multiple sets of SPS transmissions based on the single DCI message. The techniques may provide a more efficient and lower latency method for reconfiguring more than one set of SPS transmissions (e.g., when compared to a DCI message reconfiguring only a single set of SPS transmissions).

Aspects of the disclosure are initially described in the context of a wireless communications system. Additional wireless communications systems, a periodic traffic transmission, and a process flow are then provided to describe aspects of the disclosure. Aspects of the disclosure are further illustrated by and described with reference to apparatus diagrams, system diagrams, and flowcharts that relate to multiple autonomous transmission control by a single DCI message.

FIG. 1 illustrates an example of a wireless communications system 100 that supports multiple autonomous transmission control by a single DCI message in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Some wireless communications systems may support URLLC services. As the name suggests, URLLC may be characterized by low latency and high reliability requirements (e.g., ≤1 ms latency and ≥99.9999% reliability). In some cases, the URLLC services may further include periodic traffic transmitted between a base station 105 and a UE 115. For example, in factory automation URLLC use cases, uplink and downlink periodic transmissions may be sent between a PLC (e.g., via a base station 105) and an S/A (e.g., a UE 115). This periodic traffic may occur at set time periods based on a configured periodicity. Additionally, periodic traffic may not be limited to URLLC services and may be utilized for services where data is regularly transmitted between a base station 105 and a UE 115 at set time intervals (e.g., periodically). In some cases, a base station 105 may include a large number of UEs 115 that are connected to it. For example, the factory automation URLLC use cases may involve a high user density (e.g., one UE 115 per square meter), resulting in a large number of UEs 115 per base station 105. As such, if a physical downlink control channel (PDCCH) is utilized for signaling the periodic traffic for each data transmission (e.g., downlink and uplink transmissions), a bottleneck may occur where there are too many PDCCHs to transmit at a given time for the base station 105, and the base station 105 may not be able to manage the high quantity of the periodic traffic. For example, sending downlink grants (i.e., sending one DCI per slot) to each UE 115 may result in a large PDCCH overhead (e.g., signaling overhead) for the base station 105.

To reduce the PDCCH overhead and needs, autonomous transmission configurations may be utilized, where grants are configured semi-statically (e.g., via RRC signaling and/or a DCI) by the base station 105 for each of the UEs 115. The autonomous transmission configurations may allocate one or more RBs based on a periodicity that may be utilized for the periodic traffic and/or include a modulation and coding scheme (MCS) (e.g., data rate) for the periodic traffic. The autonomous transmission configuration may further indicate a time and/or frequency offset for the periodic traffic. In some cases, the autonomous transmission configurations may include an SPS configuration and/or a CS configuration (e.g., Type 1 Configured Grants and Type 2 Configured Grants). For example, the SPS configuration may be utilized for downlink transmissions, and the CS configuration may be utilized for uplink transmissions. That is, a configured grant may be utilized for uplink transmissions. Additionally or alternatively, the SPS configurations may be utilized for both uplink and downlink transmissions, or the CS configuration may be utilized for both uplink and downlink transmissions (e.g., based on the network for wireless communications system 100). While SPS or CS transmissions may both be examples of various autonomous transmissions, the terms "SPS", "CS", and "autonomous" may each be used interchangeably herein. For example, the SPS configuration may correspond to a configured grant.

In some cases, a UE 115 may be configured for multiple SPS transmissions. The base station 105 may configure one or more of the SPS configurations to adapt to changing radio frequency (RF) conditions via a downlink control channel using a DCI message. Conventionally, the base station 105 may transmit SPS transmission configurations to the UE 115 corresponding to each of the SPS transmissions. In some cases, the UE 115 may not be able to receive more than one DCI message for configuring an SPS transmission at a same time (e.g., due to a blind decoding complexity). As such, the base station 105 may transmit each of the SPS-specific DCI configuration messages at different times, which may cause additional delay in transmitting the DCI messages. This delay may not meet URLLC system requirements. That is, transmitting these SPS-specific DCI messages may result in additional signaling and require more PDCCH resources increasing the PDCCH overhead and latency that was previously reduced via the SPS transmission configuration.

Wireless communications system 100 may support multiple autonomous transmission control by a single DCI message. The techniques may include a base station 105 transmitting a single DCI message to a UE 115 that is associated with more than one set of SPS transmissions. The single DCI message may indicate a reconfiguration for more than one of the sets of SPS transmissions. The use of a single DCI message to configure more than one SPS transmission may increase efficiency and decrease decoding complexity.

Figure 2:
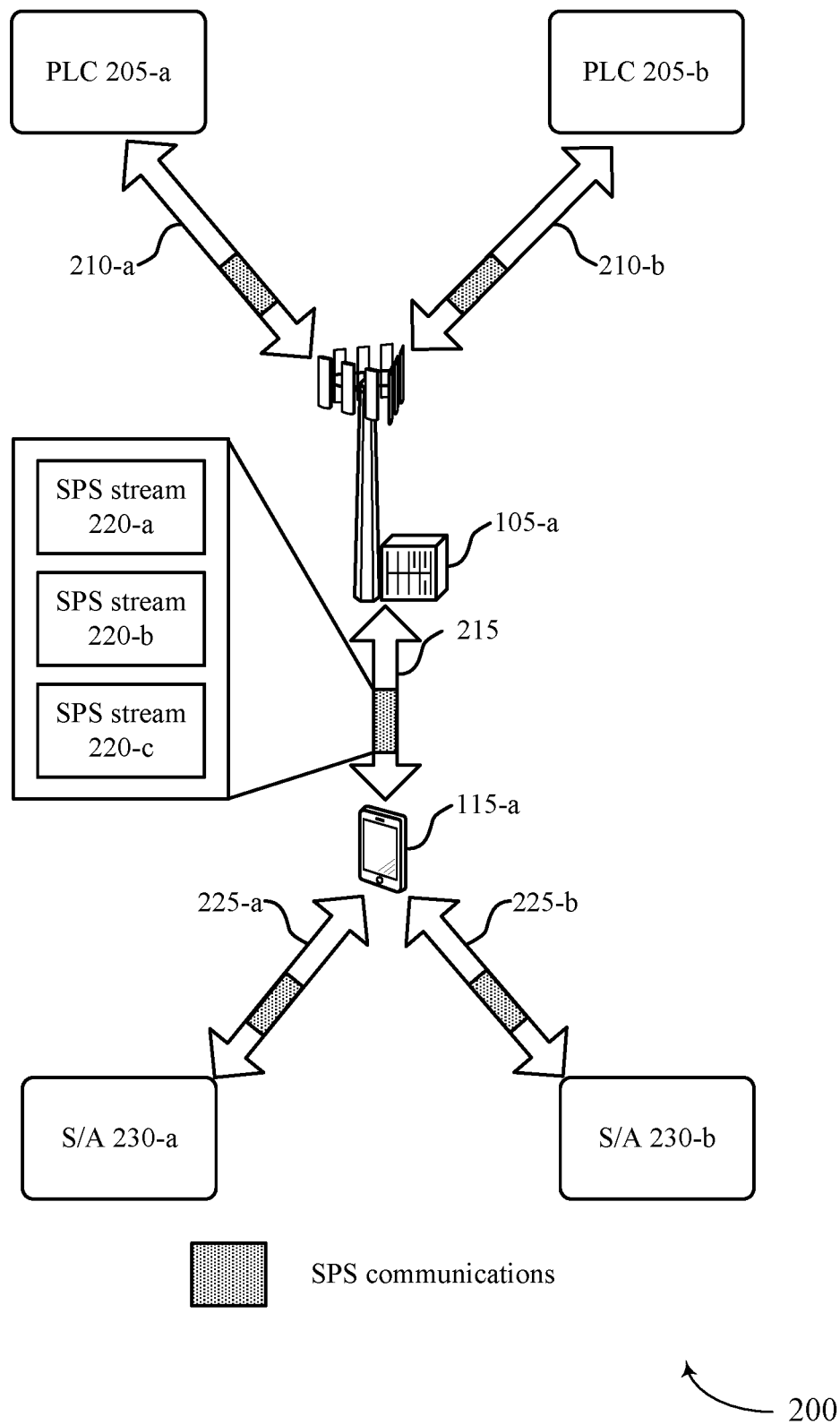
FIGS. 2 and 3 illustrate examples of wireless communications systems that support multiple autonomous transmission control by a single DCI message in accordance with aspects of the present disclosure.

FIG. 2 illustrates an example of a wireless communications system 200 that supports multiple autonomous transmission control by a single DCI message in accordance with aspects of the present disclosure. In some examples, wireless communications system 200 may implement aspects of wireless communication system 100. Wireless communications system 200 may include a base station 105-a and a UE 115-a, which may be examples of base stations 105 and UEs 115, respectively, as described above with reference to FIG. 1.

PLCs 205-a and 205-b may be communicating with S/As 230 using one or more SPS streams 220. The periodic transmissions made in accordance with an SPS stream 220 may be referred to as a set of SPS transmissions. Each of the SPS streams 220 may be transmitted from a PLC 205 to an S/A 230 via base station 105-a and UE 115-a. For example, a periodic downlink and/or uplink transmission for an SPS stream 220 may be transmitted from a PLC 205 to the base station 105-a via a connection 210 (e.g., a wired connection). The base station 105-a may transmit the downlink transmission of SPS stream 220-a to UE 115-a via connection 215 (e.g., a wireless connection). The UE 115-a may in turn transmit the downlink transmission of SPS stream 220-a to the appropriate S/A 230 via connection 225 (e.g., a wired connection). Here, a single UE 115-a may be configured to transmit multiple SPS streams 220 (e.g., SPS stream 220-a, SPS stream 220-b, and SPS stream 220-c). That is, UE 115-a may be connected with more than one S/A (e.g., S/A 230-a and S/A 230-b) and/or UE 115-a may be connected to an S/A 230 with more than one SPS streams 220 (e.g., S/A 230-a may communicate with PLC 205-a via SPS streams 220-a and 220-b).

Each of the SPS streams 220 may be configured with specific transmission parameters. In some cases, the transmission parameters may be initially configured to UE 115-a via RRC signaling or a combination of RRC signaling and DCI messaging (e.g., RRC signals the configuration and DCI activates the configuration). The transmission parameters may include a certain bandwidth (e.g., a number of RBs for the SPS transmissions within SPS streams 220) and/or an MCS (e.g., data rate) for the SPS streams 220. Additionally or alternatively, each of the SPS streams 220 may have transmission parameters such as a periodicity for transmission, a time offset, and/or a frequency offset.

The base station 105-a may detect a change in RF channel conditions. For example, the base station 105-a may detect interference decreasing the quality of the SPS streams 220. As such, the base station 105-a may determine to reconfigure one or more of the SPS streams 220 to account for the new RF channel conditions. The base station 105-a may reconfigure one or more of the SPS streams 220 via a downlink control channel. In some cases, the base station 105-a may transmit a single DCI message indicating the one or more SPS transmission reconfigurations. For example, the base station 105-a may transmit a single DCI message to the UE 115-a indicating an updated configuration for SPS stream 220-a, SPS stream 220-b, and SPS stream 220-c. The reconfiguration may indicate to the UE 115-a to update one or more of the transmission parameters for the SPS streams 220. For example, the reconfiguration may indicate to the UE 115-a to increase a frequency offset for each of the SPS streams 220 by a same constant. In some other examples, the reconfiguration may indicate to the UE 115-a to change from a first MCS to a second MCS. In some other examples, the reconfiguration may indicate to the UE 115-a to deactivate the SPS streams 220.

The UE 115-a may adapt the SPS streams 220 according to the indicated reconfigurations. That is, the UE 115-a may communicate with the base station 105-a according to the updated transmissions parameters. In some cases, this may allow the base station 105-a to transmit a single DCI message to the UE 115-a in order to reconfigure the SPS streams 220 in light of changing RF channel conditions. This may allow for a more efficient and lower latency system than the case were each of the SPS streams 220 is reconfigured using a different DCI message.

Figure 3:
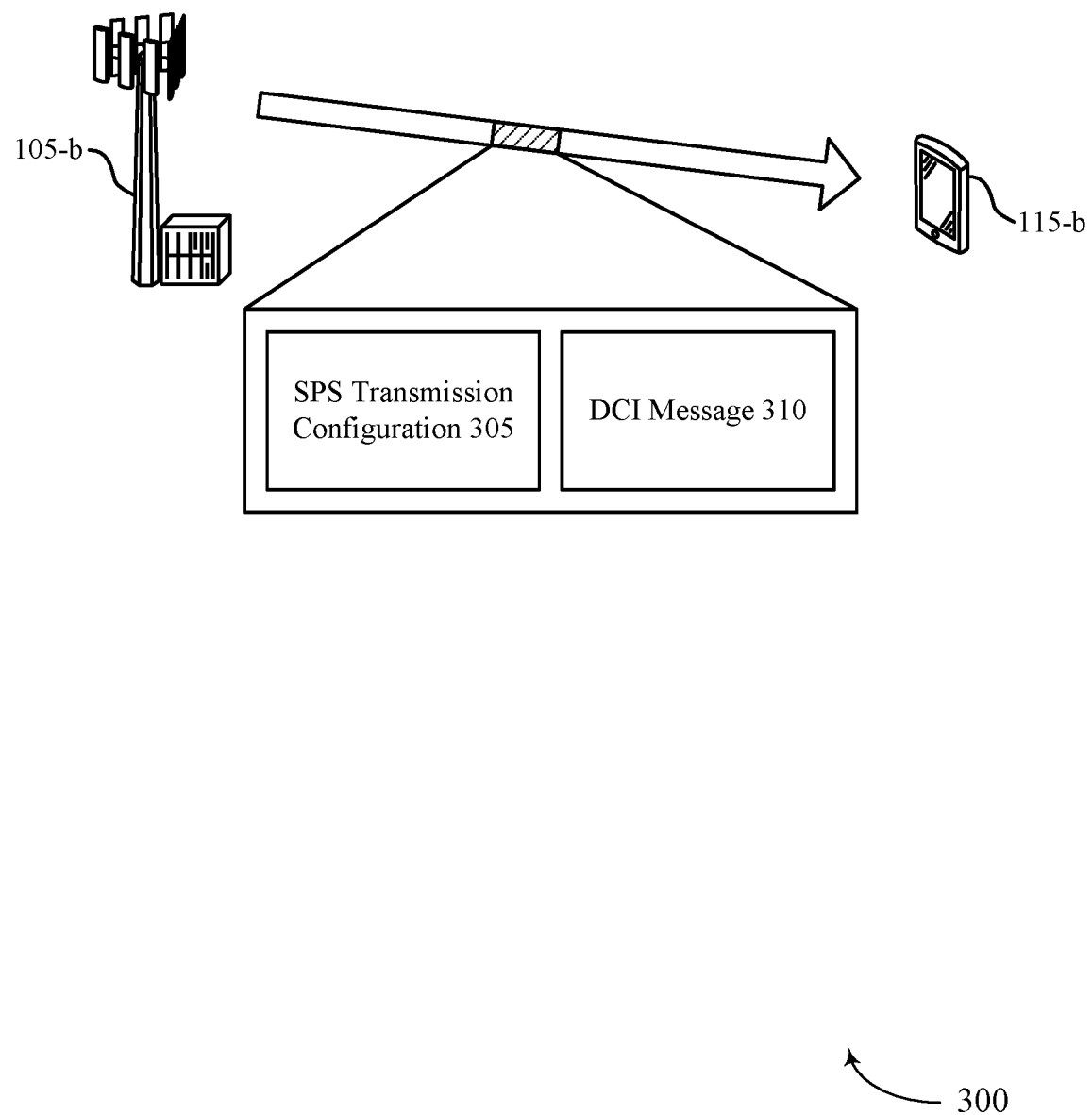

FIG. 3 illustrates an example of a wireless communications system 300 that supports multiple autonomous transmission control by a single DCI message in accordance with aspects of the present disclosure. In some examples, wireless communications system 300 may implement aspects of wireless communication system 100 and/or 200. Wireless communications system 300 may include a base station 105-b and a UE 115-b, which may be examples of base stations 105 and UEs 115, respectively, as described above with reference to FIG. 1 and FIG. 2.

Base station 105-b may transmit an initial SPS transmission configuration 305 to the UE 115-b via RRC signaling. For example, the SPS transmission configuration 305 may include a configuration for parameters such as time offset, frequency offset, MCS, and/or bandwidth. In some cases, the SPS transmission configuration 305 may be signaled to the UE 115-b via RRC signaling or a combination of RRC signaling and DCI messaging (e.g., RRC signals the configuration and DCI activates the configuration). In some cases, the UE 115-b may be transmitting multiple sets of SPS transmissions. In this case, the SPS transmission configuration 305 may include configurations for more than one set of SPS transmissions.

The RRC message may indicate a bitmap corresponding to each of the SPS transmissions. That is, the RRC message may map the specific set of SPS transmissions to a bitmap of each of the SPS transmissions. In some cases, the SPS transmission configuration 305 may include an indication of SPS transmission sets that may be in a group. That is, the SPS transmission configuration 305 may indicate that the sets of SPS transmissions may be organized within one or more subsets of SPS transmissions. Each subset of SPS transmissions may correspond to a group. In some cases, the base station 105-b may reconfigure multiple sets of SPS transmissions according to the groups indicated by the SPS transmission configuration 305.

The SPS transmission configuration 305 may further indicate an RNTI corresponding to one or more sets of SPS transmissions. The indicated RNTI may be used by the base station 105-b to scramble subsequent DCI messages 310. The RNTI used to scramble the DCI message 310 may correspond to one or more sets of SPS transmissions (e.g., the UE 115-b may descramble the DCI messages 310 according to the same RNTI). In some examples, each of the sets of SPS transmissions may be configured with a unique cell RNTI (C-RNTI). Additionally or alternatively, the SPS transmission configuration 305 may indicate an RNTI for a group of SPS transmission sets. The RNTI may be an additional unique RNTI corresponding to the group of sets of SPS transmissions or may be an RNTI associated with one of the SPS transmissions sets including the group. In some other cases, the group RNTI may be a function of each of the RNTIs associated with the each of the SPS transmission sets including the group.

In some cases, the base station 105-b may detect a change in RF channel conditions. As such, the base station 105-a may determine to reconfigure one or more of the sets of SPS transmissions in order to account for the new RF channel conditions. The base station 105-b may transmit a DCI message 310 to UE 115-b including an indication for a reconfiguration of more than one set of SPS transmissions. The DCI message 310 may indicate adjustments to be made to the SPS configurations (e.g., changes to the time offset, frequency offset, MCS, and bandwidth). In one case, the adjustments may include the DCI message 310 indicating to the UE 115-b to deactivate the SPS configuration (e.g., indicated by SPS transmission configuration 305). In another case, the DCI message 310 may include a number indicating an adjustment. In some cases, the number may indicate a base offset value to be used in conjunction with a previously configured value. For example, UE 115-b may have previously configured an SPS transmission to have a first time offset and the DCI message 310 may include a base offset number to be added to the first time offset. In another case, the number may be an index indicated a specific configuration. For example, the number may be a number from 0 to 3, where each of the numbers corresponds to a unique MCS. Here, the UE 115-b may change the MCS as indicated by the DCI message 310.

The DCI message 310 may be scrambled by the base station 105-b using an RNTI corresponding to one or more SPS transmission sets. UE 115-b may descramble the DCI message 310 utilizing the same RNTI. In some instances, the RNTI used to scramble and descramble the DCI message 310 may indicate that the DCI message 310 is used to configure more than one set of SPS transmissions. That is, for each DCI message 310, the UE 115-b may descramble the DCI message 310 using an RNTI and determine if the descrambled DCI message 310 passes a CRC using that specific RNTI (e.g., if the RNTI successfully descrambles the DCI message 310). If the RNTI used to successfully descramble the DCI message 310 corresponds to more than one set of SPS transmissions (e.g., as indicated by the SPS transmission configuration 305), the UE 115-b may determine that the DCI message 310 contains reconfiguration information for multiple SPS transmission sets.

The DCI message 310 may reconfigure more than one set of SPS transmissions in several ways. In a first embodiment, the DCI message 310 may include an indication of the sets of SPS transmissions being reconfigured. That is, if UE 115-b transmits multiple sets of SPS transmissions, a DCI message 310 may indicate a subset of the multiple sets being reconfigured by the DCI message 310. In some cases, the DCI message 310 may include an explicit indication of each set of SPS transmissions being reconfigured. The explicit indication may include an identifier (e.g., a C-RNTI) for each of the sets of SPS transmissions being reconfigured. Additionally or alternatively, the DCI message 310 may include a bitmap indicating which of the multiple sets of SPS transmissions are to be reconfigured according to the reconfiguration within DCI message 310.

According to a second embodiment, the DCI message 310 may include more than one field, where each field corresponds to one of the multiple sets of SPS transmissions being reconfigured by DCI message 310. That is, the SPS transmission configuration 305 may indicate specific resources within the DCI message 310 (e.g., a specific physical resource block (PRB) corresponding to a field within the DCI message 310) for each of the multiple sets of SPS transmissions. That is, each of the sets of SPS transmissions may have a unique field within the DCI message 310. The UE 115-b may determine to reconfigure more than one set of SPS transmissions based on whether the field corresponding to that set of SPS transmissions contains reconfiguration information.

In a third embodiment, the DCI message 310 may include a field that indicates a reconfiguration for more than one set of SPS transmissions. Here, more than one of the sets of SPS transmissions may correspond to a group of SPS transmissions (e.g., configured as a group by SPS transmissions configuration 305). That is, the DCI message 310 may indicate a single reconfiguration which may be applied to more than one set of SPS transmissions. In some cases, the field may include a single base offset to be applied by each of the sets of SPS transmissions within the group.

The use of a single DCI message 310 to configure more than one SPS transmission may increase efficiency and decrease decoding complexity. In some cases, the efficiency may be increased by decreasing the amount of information transmitted (e.g., one DCI message 310 rather than multiple) and by decreasing a number of CRCs (e.g., decreasing from one CRC per SPS configuration to one CRC for more than one SPS configuration). Additionally or alternatively, the decoding complexity may be decreased as the UE may no longer need to consider an RNTI for each SPS (or alternatively, may consider group RNTIs first before individual RNTIs are considered) when decoding the downlink control channel for SPS configuration DCI messages 310.

Figure 4:
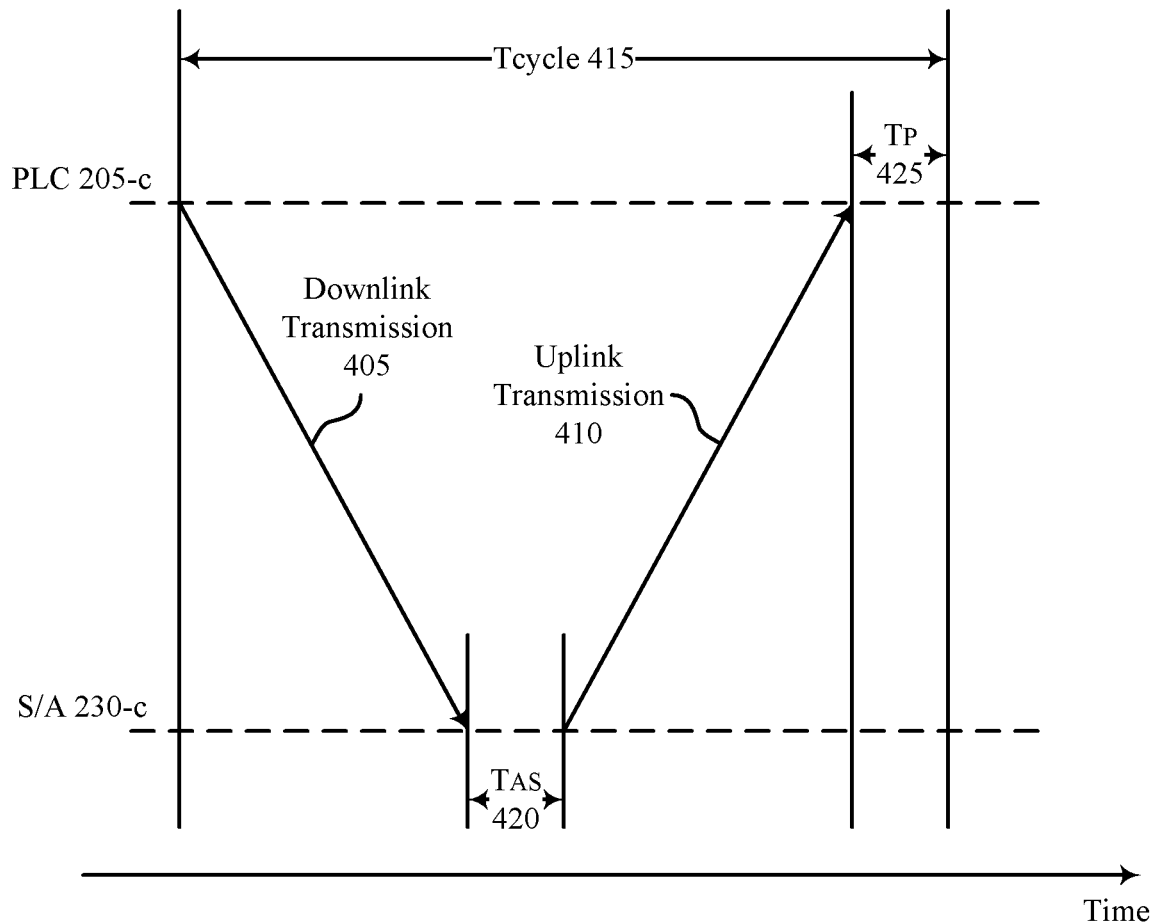
FIG. 4 illustrates an example of a periodic traffic transmission that supports multiple autonomous transmission control by a single DCI message in accordance with aspects of the present disclosure.

FIG. 4 illustrates an example of a periodic traffic transmission 400 that supports multiple autonomous transmission control by a single DCI message in accordance with aspects of the present disclosure. In some examples, periodic traffic transmission 400 may implement aspects of wireless communication system 100, 200, and/or 300. Periodic traffic transmission 400 may include data transmitted between a PLC 205-c and an S/A 230-c (e.g., sent between a base station 105 and a UE 115 as described above with reference to FIGS. 1 through 3). Additionally, PLC 205-c and an S/A 230-c may be part of a factory automation URLLC use case, where metrics are transmitted from S/A 230-c to PLC 205-c within the low latency and high reliability requirements for URLLC services.

In some cases, PLC 205-c may send a downlink transmission 405 periodically to S/A 230-c. The downlink transmission 405 may request information (e.g., performance metrics) from S/A 230-c. Accordingly, S/A 230-c may send an uplink transmission 410 in response to the downlink transmission 405. Alternatively, although not shown, S/A 230-c may send uplink transmission 410 without receiving the downlink transmission 405 based on a configured transmission schedule for the periodic traffic. The downlink transmission 405 and the uplink transmission 410 may be sent within a cycle duration ($T_{cycle}$) 415, where $T_{cycle}$ 415 represents one period for the periodic traffic. Additionally, an actuation and sensing duration ($T_{AS}$) 420 may occur between the downlink transmission 405 and the uplink transmission 410, where S/A 230-c receives the downlink transmission 405 and gathers the requested data. After receiving the uplink transmission 410, PLC 205-c may use a processing duration ($T_P$) 425 to process the uplink transmission 410 and receive the information from S/A 230-c.

As described herein, periodic traffic transmission 400 and $T_{cycle}$ 415 may represent one period of an SPS (e.g., an autonomous) transmission configuration. Accordingly, periodic traffic transmission 400 may be sent according to parameters such as a configured time offset, frequency offset, MCS, and bandwidth. Additionally, the SPS transmission configuration may include multi-SPS transmission control by a single DCI message for adjusting more than one SPS transmission configuration with a single signal to the UE associated with S/A 230-c. As such, if different parameters for periodic traffic transmission 400 are needed, PLC 205-c and S/A 230-c may adjust the parameters for the SPS transmission configuration based on signaling indicating parameter adjustment for multiple PLCs 205 associated with the UE.

Figure 5:
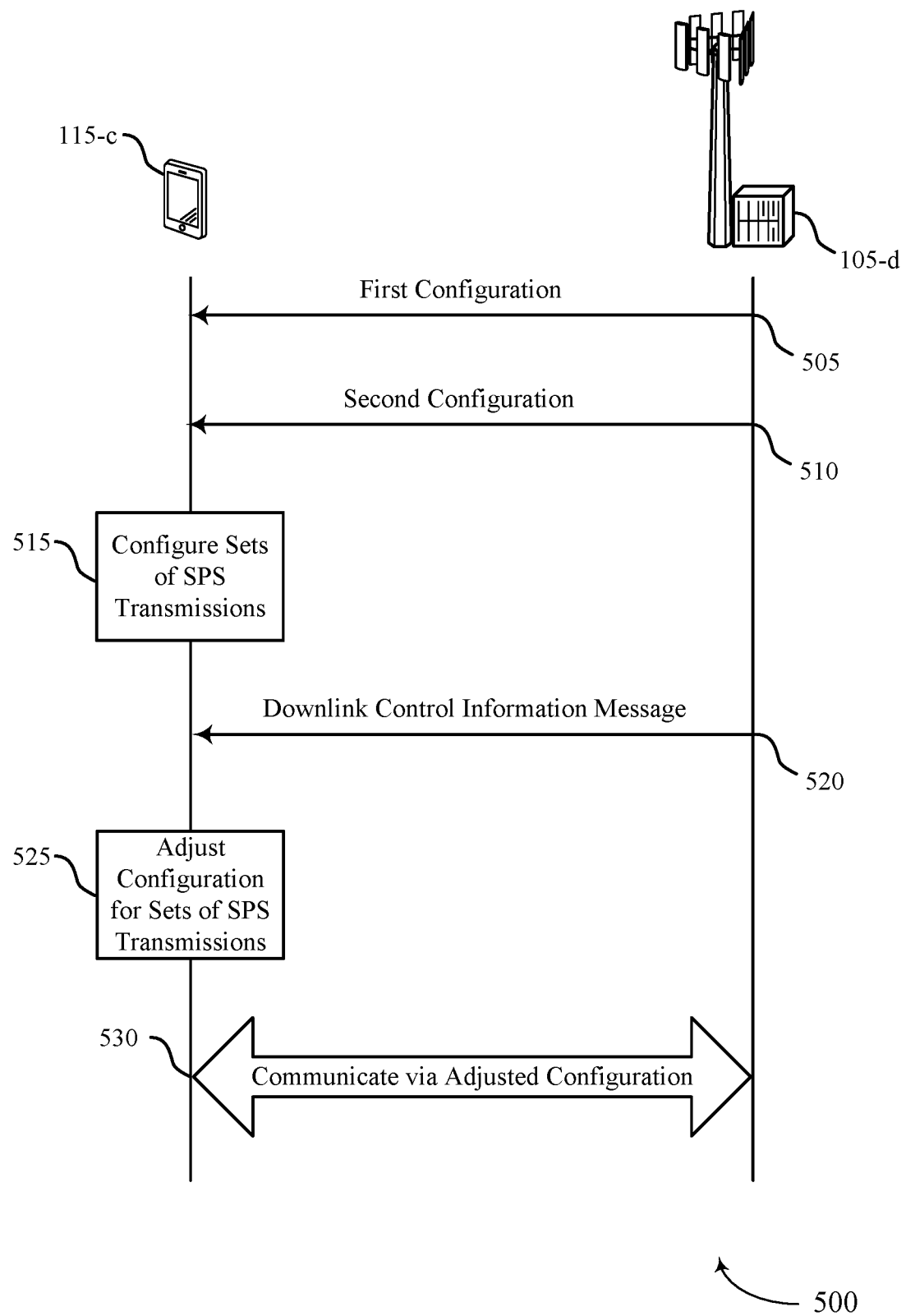
FIG. 5 illustrates an example of a process flow that supports multiple autonomous transmission control by a single DCI message in accordance with aspects of the present disclosure.

FIG. 5 illustrates an example of a process flow 500 that supports multiple autonomous transmission control by a single DCI message in accordance with aspects of the present disclosure. In some examples, process flow 500 may implement aspects of wireless communications system 100, 200, and/or 300. Process flow 500 may include a base station 105-c and a UE 115-c, which may be examples of a corresponding base station 105 and UE 115, respectively, as described above with reference to FIGS. 1 through 4.

In the following description of the process flow 500, the operations between UE 115-d and base station 105-d may be performed in different orders or at different times. Certain operations may also be left out of the process flow 500, or other operations may be added to the process flow 500. It is to be understood that while UE 115-c and base station 105-c are shown performing a number of the operations of process flow 500, any wireless device may perform the operations shown.

At 505, UE 115-c may receive, from base station 105-c, a first configuration for a first set of SPS transmissions with base station 105-c. A configuration for a set of SPS transmissions may be indicative of one or more of a set of resource blocks, a time offset, a periodicity, or a MCS associated with the set of SPS transmissions.

At 510, UE 115-c may receive, from base station 105-c, a second configuration for a second set of SPS transmissions with base station 105-c. In some cases, the first and/or second configuration may further include a grouping indication that indicates that the first set of SPS transmissions and the second set of SPS transmissions are in a configuration group, where the indication that identifies both the first configuration and the second configuration indicates that both the first configuration and the second configuration are to be updated based at least in part on the first set of SPS transmissions and the second set of SPS transmissions being in a same configuration group.

At 515, UE 115-c may configure the sets of SPS transmissions according to the first and second configurations indicated by base station 105-d.

At 520, UE 115-c may receive, from base station 105-d, an indication within a DCI message that identifies both the first configuration and the second configuration and indicates that at least one of the first configuration and the second configuration is to be updated. In some cases, base station 105-d may scramble the DCI message using a group RNTI identifier. The group RNTI identifier may indicate, to the UE 115-c, that the DCI includes the indication identifying both the first configuration and the second configuration based on the group RNTI being used to descramble the DCI message.

In some examples, the group RNTI may be a C-RNTI. In some other cases, UE 115-c may determine the group RNTI based on receiving a first RNTI with the first configuration and receiving a second RNTI with the second configuration. The group RNTI may be a function of the first RNTI and the second RNTI. In some instances, UE 115-c may receive one or more RNTIs with the first and second configurations and may select the group RNTI from the one or more received RNTIs.

In some cases, receiving the indication may include receiving a bitmap which indicates updates to the first configuration and the second configuration. In some other cases, receiving the indication may include receiving, in the DCI message, a first indication and a corresponding first identifier associated with the first configuration; and receiving, in the DCI message, a second indication and a corresponding second identifier associated with the second configuration.

In some other cases, receiving the indication may include receiving a first reconfiguration indication within a first field of the DCI message; and receiving a second reconfiguration message within a second field of the DCI message that is different from the first field. In some instances, receiving the indication may include receiving a single reconfiguration indication within a field of the DCI message which indicates updates to the first configuration and the second configuration.

At 525, UE 115-c may adjust at least one of the first configuration and the second configuration according to the indication included within the DCI message. In some examples, the indication includes a value by which both the first configuration and the second configuration are to be adjusted. Here, adjusting the first and second configurations may include identifying the value from the indication, where the value is an updated base time offset. Then, the UE 115-c may adapt a first time offset corresponding to the first set of SPS transmissions by adding the updated base time offset to an initial first time offset associated with the first configuration and adapt a second time offset corresponding to the second set of SPS transmissions by adding the updated base time offset to an initial second time offset associated with the second configuration In another example, adjusting the first and second configurations may include identifying the value from the indication, where the value is an updated base frequency offset. Here, the UE 115-*c* may adapt a first frequency offset corresponding to the first set of SPS transmissions by adding the updated base frequency offset to an initial first frequency offset associated with the first configuration and adapt a second frequency offset corresponding to the second set of SPS transmissions by adding the updated base frequency offset to an initial second frequency offset associated with the second configuration. In some other examples, adjusting the first and second configurations may include deactivating one or both of the first and second configurations.

In another example, adjusting the first and second configurations may include identifying the value from the indication, where the value is an updated base bandwidth allocation. Here, the UE 115-*c* may adapt a first bandwidth allocation corresponding to the first set of SPS transmissions by adding the updated base bandwidth allocation to an initial first bandwidth allocation associated with the first configuration and adapt a second bandwidth allocation corresponding to the second set of SPS transmissions by adding the updated base bandwidth allocation to an initial second bandwidth allocation associated with the second configuration.

At 530, the base station 105-*c* and the UE 115-*c* may communicate via the first set of SPS transmissions using the first configuration and via the second set of SPS transmissions using the second configuration, where at least one of the first configuration or the second configuration is adjusted in accordance with the indication.

Figure 6:
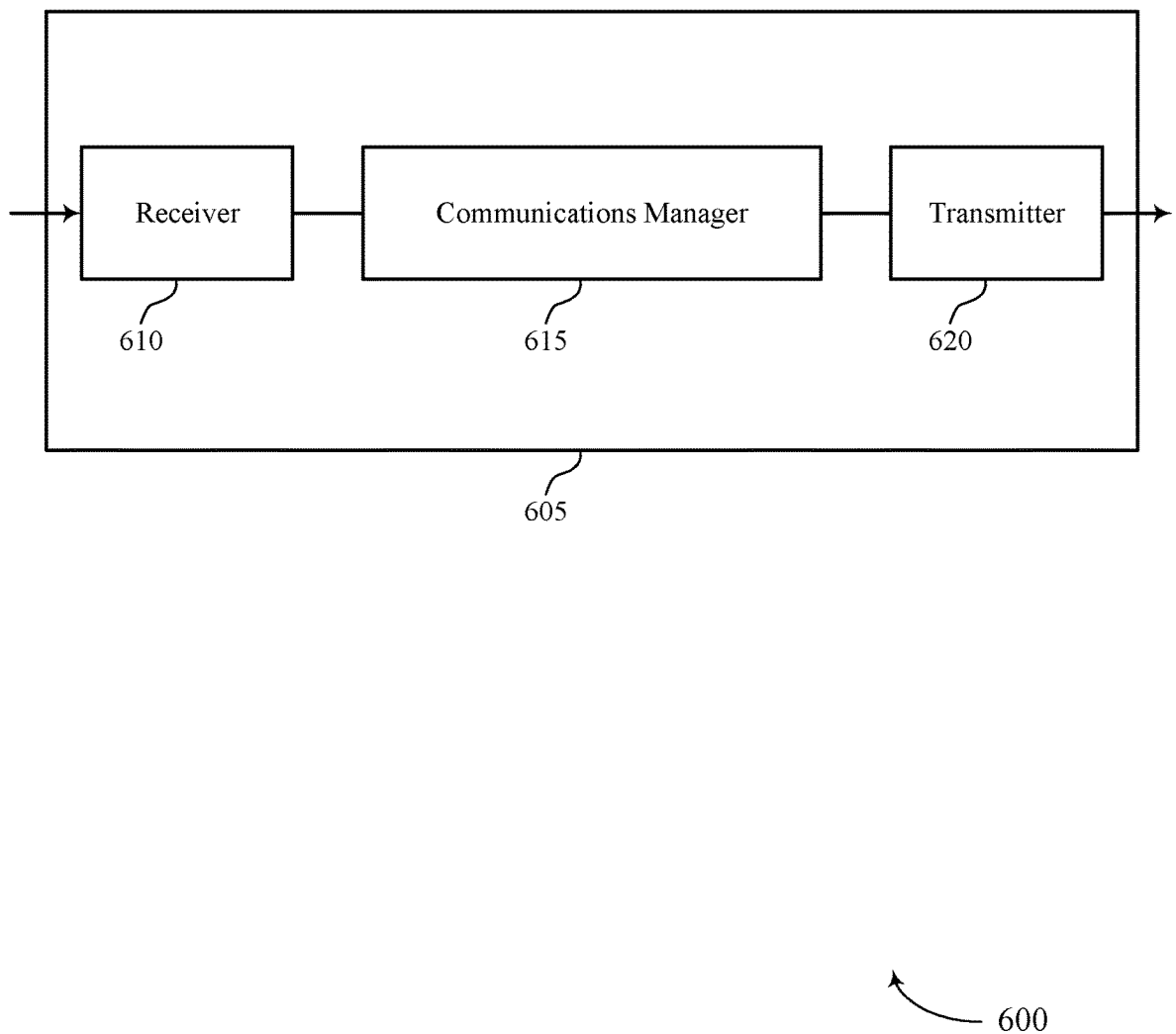
FIGS. 6 and 7 show block diagrams of devices that support multiple autonomous transmission control by a single DCI message in accordance with aspects of the present disclosure.

FIG. 6 shows a block diagram 600 of a device 605 that supports multiple autonomous transmission control by a single DCI message in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to multiple autonomous transmission control by a single DCI message, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, a first configuration for a first set of SPS transmissions with the base station and a second configuration for a second set of SPS transmissions with the base station, receive, from the base station, an indication within a DCI message that identifies both the first configuration and the second configuration and indicates that at least one of the first configuration and the second configuration is to be updated, adjust at least one of the first configuration and the second configuration according to the indication included within the DCI message, and communicate with the base station via the first set of SPS transmissions using the first configuration and via the second set of SPS transmissions using the second configuration, where at least one of the first configuration or the second configuration is adjusted in accordance with the indication. The communications manager 615 may be an example of aspects of the communications manager 910 described herein.

The actions performed by the communications manager 615 as described herein may be implemented to realize one or more potential advantages. For example, adjusting more than one configuration based on a single DCI message may decrease latency associated with communications between a UE 115 and a base station 105. Specifically, the single DCI message may indicate an updated configuration for the first and second SPS transmissions. The communications manager 615 may decode the single DCI message and adapt both of the first and second SPS transmissions in response to the single DCI message. Based on receiving a single DCI (e.g., as opposed to multiple DCI messages corresponding to each configuration), a processor of the UE 115 or base station 105 (e.g., a processor controlling the receiver 610, the communications manager 615, the transmitter 620, etc.) may reduce processing resources used for reception. As such, the UE 115 or base station 105 may reduce the number of reception and decoding processes performed to successfully receive information from a transmitting device (e.g., by reducing the number of DCI messages). Reducing the number of reception and decoding processes may reduce a number of times the processor ramps up processing power and turns on processing units to handle message reception and decoding.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
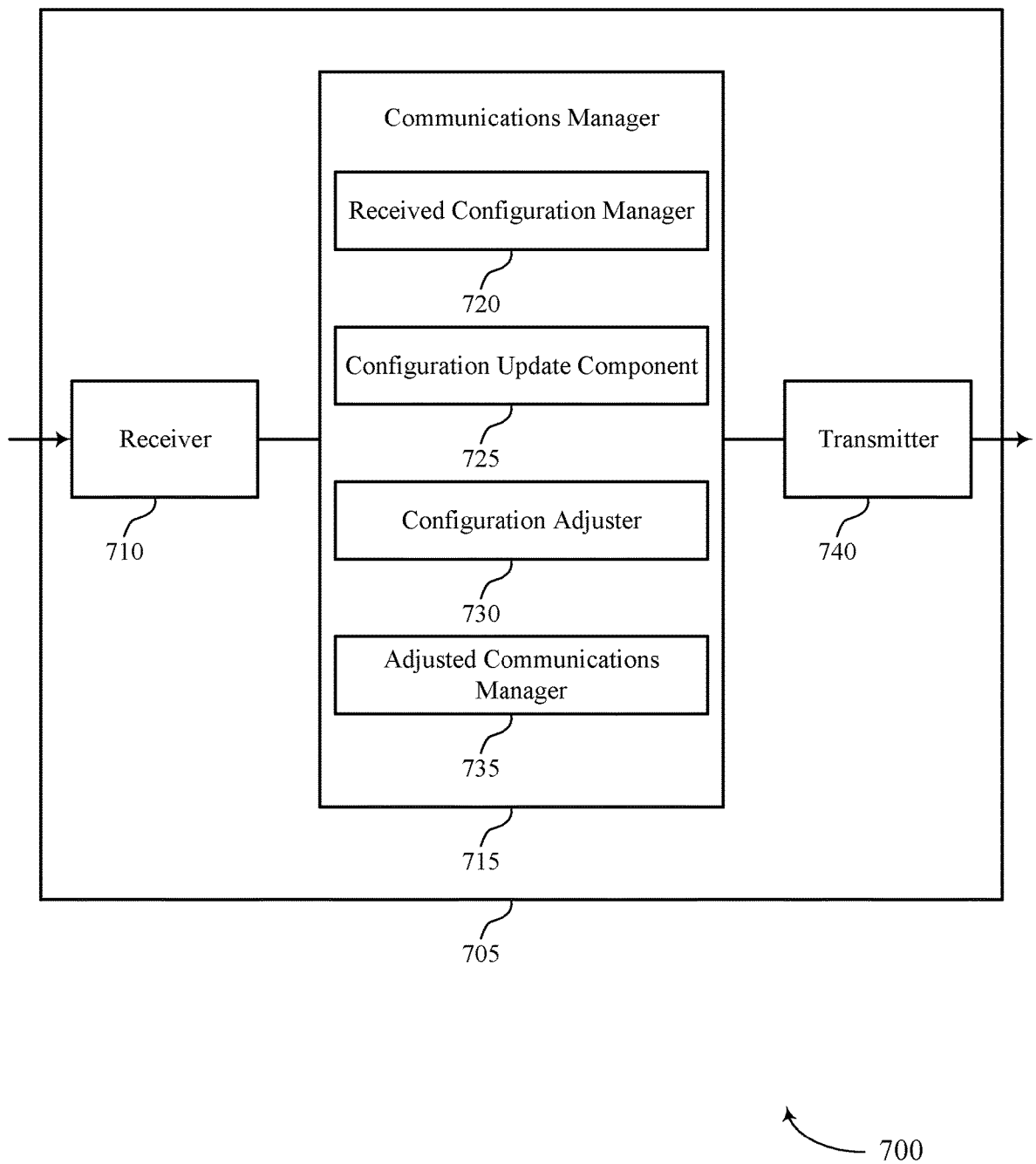

FIG. 7 shows a block diagram 700 of a device 705 that supports multiple autonomous transmission control by a single DCI message in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to multiple autonomous transmission control by a single DCI message, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a received configuration manager 720, a configuration update component 725, a configuration adjuster 730, and an adjusted communications manager 735. The communications manager 715 may be an example of aspects of the communications manager 910 described herein.

The received configuration manager 720 may receive, from a base station, a first configuration for a first set of SPS transmissions with the base station and a second configuration for a second set of SPS transmissions with the base station.

The configuration update component 725 may receive, from the base station, an indication within a DCI message that identifies both the first configuration and the second configuration and indicates that at least one of the first configuration and the second configuration is to be updated. The configuration adjuster 730 may adjust at least one of the first configuration and the second configuration according to the indication included within the DCI message.

The adjusted communications manager 735 may communicate with the base station via the first set of SPS transmissions using the first configuration and via the second set of SPS transmissions using the second configuration, where at least one of the first configuration or the second configuration is adjusted in accordance with the indication.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
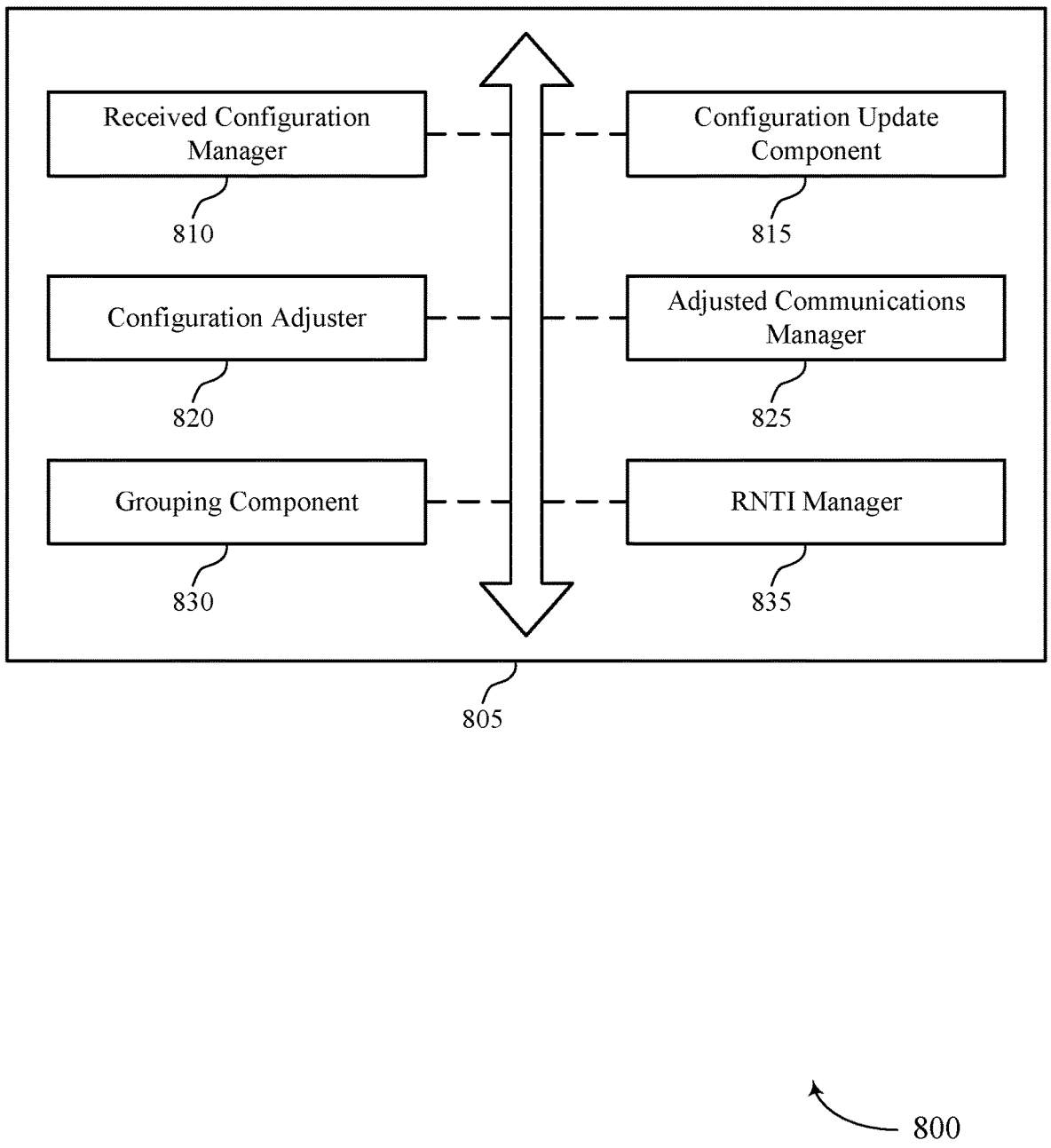
FIG. 8 shows a block diagram of a communications manager that supports multiple autonomous transmission control by a single DCI message in accordance with aspects of the present disclosure.

FIG. 8 shows a block diagram 800 of a communications manager 805 that supports multiple autonomous transmission control by a single DCI message in accordance with aspects of the present disclosure. The communications manager 805 may be an example of aspects of a communications manager 615, a communications manager 715, or a communications manager 910 described herein. The communications manager 805 may include a received configuration manager 810, a configuration update component 815, a configuration adjuster 820, an adjusted communications manager 825, a grouping component 830, and a RNTI manager 835. Each of these modules may communicate, directly or indirectly, with one another (e.g., via one or more buses).

The received configuration manager 810 may receive, from a base station, a first configuration for a first set of SPS transmissions with the base station and a second configuration for a second set of SPS transmissions with the base station. In some cases, a configuration for a set of SPS transmissions is indicative of one or more of a set of resource blocks, a time offset, a periodicity, or a MCS associated with the set of SPS transmissions.

The configuration update component 815 may receive, from the base station, an indication within a DCI message that identifies both the first configuration and the second configuration and indicates that at least one of the first configuration and the second configuration is to be updated. In some examples, the configuration update component 815 may receive a bitmap which indicates updates to the first configuration and the second configuration. In some other examples, the configuration update component 815 may receive, in the DCI message, a first indication and a corresponding first identifier associated with the first configuration. In some examples, the configuration update component 815 may receive, in the DCI message, a second indication and a corresponding second identifier associated with the second configuration. In some examples, the configuration update component 815 may receive a first reconfiguration indication within a first field of the DCI message. In some examples, the configuration update component 815 may receive a second reconfiguration message within a second field of the DCI message that is different from the first field. In some examples, the configuration update component 815 may receive a single reconfiguration indication within a field of the DCI message which indicates updates to the first configuration and the second configuration. In some examples, the configuration update component 815 may receive the DCI message via a physical downlink control channel.

The configuration adjuster 820 may adjust at least one of the first configuration and the second configuration according to the indication included within the DCI message. In some examples, the configuration adjuster 820 may identify the value from the indication, where the value is an updated base time offset. In some cases, the indication includes a value by which both the first configuration and the second configuration are to be adjusted.

In some examples, the configuration adjuster 820 may adapt a first time offset corresponding to the first set of SPS transmissions by adding the updated base time offset to an initial first time offset associated with the first configuration. In some examples, the configuration adjuster 820 may adapt a second time offset corresponding to the second set of SPS transmissions by adding the updated base time offset to an initial second time offset associated with the second configuration.

In some examples, the configuration adjuster 820 may identify the value from the indication, where the value is an updated base frequency offset. In some examples, the configuration adjuster 820 may adapt a first frequency offset corresponding to the first set of SPS transmissions by adding the updated base frequency offset to an initial first frequency offset associated with the first configuration. In some examples, the configuration adjuster 820 may adapt a second frequency offset corresponding to the second set of SPS transmissions by adding the updated base frequency offset to an initial second frequency offset associated with the second configuration.

In some examples, the configuration adjuster 820 may identify the value from the indication, where the value is an updated base bandwidth allocation. In some examples, the configuration adjuster 820 may adapt a first bandwidth allocation corresponding to the first set of SPS transmissions by adding the updated base bandwidth allocation to an initial first bandwidth allocation associated with the first configuration. In some examples, the configuration adjuster 820 may adapt a second bandwidth allocation corresponding to the second set of SPS transmissions by adding the updated base bandwidth allocation to an initial second bandwidth allocation associated with the second configuration.

In some examples, the configuration adjuster 820 may identify the value from the indication, where the value is an updated MCS indication. In some examples, the configuration adjuster 820 may adapt a first MCS corresponding to the first set of SPS transmissions by adding the updated MCS indication to an initial MCS indication associated with the first configuration. In some examples, the configuration adjuster 820 may adapt a second MCS corresponding to the second set of SPS transmissions by adding the updated MCS indication to an initial MCS indication associated with the second configuration.

The adjusted communications manager 825 may communicate with the base station via the first set of SPS transmissions using the first configuration and via the second set of SPS transmissions using the second configuration, where at least one of the first configuration or the second configuration is adjusted in accordance with the indication.

The grouping component 830 may receive, from the base station, a grouping indication that indicates that the first set of SPS transmissions and the second set of SPS transmissions are in a configuration group, where the indication that identifies both the first configuration and the second configuration indicates that both the first configuration and the second configuration are to be updated based on the first set of SPS transmissions and the second set of SPS transmissions being in a same configuration group.

The RNTI manager 835 may descramble the DCI message using a group radio network temporary identifier. In some examples, the RNTI manager 835 may identify that the DCI message includes the indication identifying both the first configuration and the second configuration based on the group radio network temporary identifier used to descramble the DCI message. In some examples, the RNTI manager 835 may receive a first radio network temporary identifier with the first configuration. In some examples, the RNTI manager 835 may receive a second radio network temporary identifier with the second configuration.

In some examples, the RNTI manager 835 may determine the group radio network temporary identifier as a function of the first radio network temporary identifier and the second radio network temporary identifier. In some examples, the RNTI manager 835 may receive, with the first configuration and the second configuration, one or more radio network temporary identifiers. In some examples, the RNTI manager 835 may select the group radio network temporary identifier from the one or more radio network temporary identifiers. In some cases, the group radio network temporary identifier is a cell radio network temporary identifier.

Figure 9:
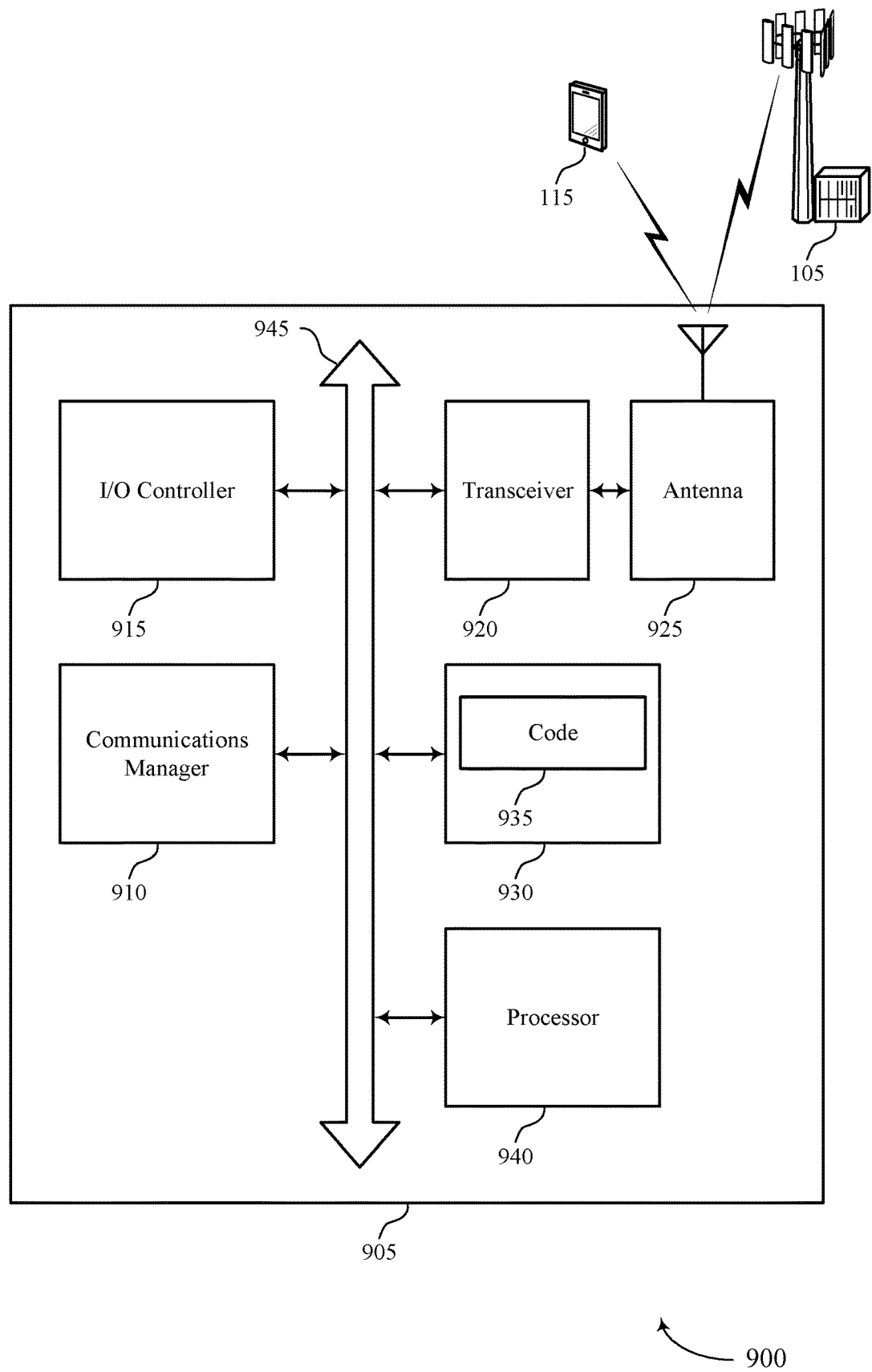
FIG. 9 shows a diagram of a system including a device that supports multiple autonomous transmission control by a single DCI message in accordance with aspects of the present disclosure.

FIG. 9 shows a diagram of a system 900 including a device 905 that supports multiple autonomous transmission control by a single DCI message in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be coupled via one or more buses (e.g., bus 945).

The communications manager 910 may receive, from a base station, a first configuration for a first set of SPS transmissions with the base station and a second configuration for a second set of SPS transmissions with the base station, receive, from the base station, an indication within a DCI message that identifies both the first configuration and the second configuration and indicates that at least one of the first configuration and the second configuration is to be updated, adjust at least one of the first configuration and the second configuration according to the indication included within the DCI message, and communicate with the base station via the first set of SPS transmissions using the first configuration and via the second set of SPS transmissions using the second configuration, where at least one of the first configuration or the second configuration is adjusted in accordance with the indication.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting multiple autonomous transmission control by a single DCI message).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
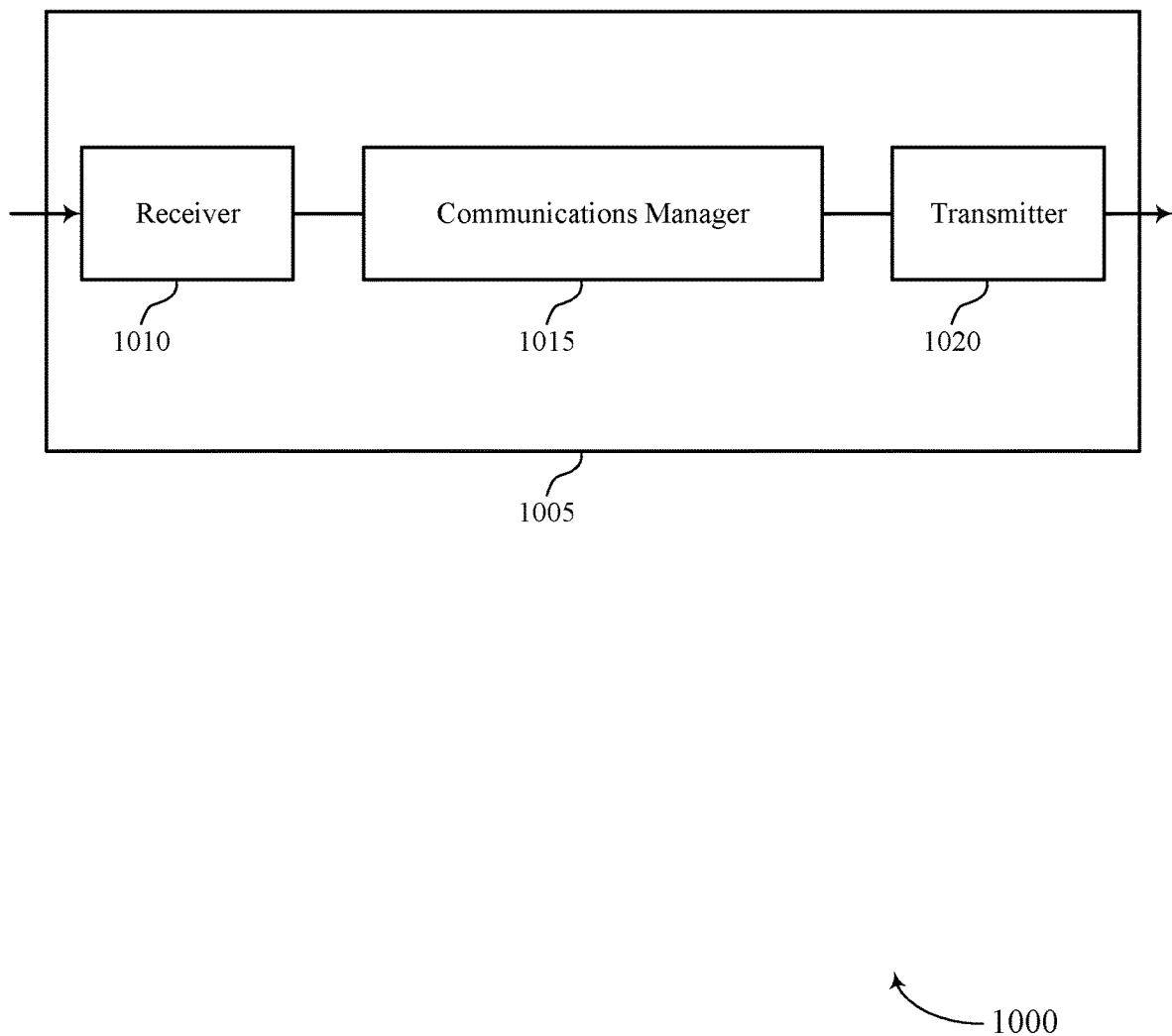
FIGS. 10 and 11 show block diagrams of devices that support multiple autonomous transmission control by a single DCI message in accordance with aspects of the present disclosure.

FIG. 10 shows a block diagram 1000 of a device 1005 that supports multiple autonomous transmission control by a single DCI message in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to multiple autonomous transmission control by a single DCI message, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, a first configuration for a first set of SPS transmissions with the base station and a second configuration for a second set of SPS transmissions with the base station, transmit, to the UE, an indication within a DCI message that identifies both the first configuration and the second configuration and indicates that at least one of the first configuration and the second configuration is to be updated, adjust at least one of the first configuration and the second configuration according to the indication included within the DCI message, and communicate with the UE via the first set of SPS transmissions using the first configuration and via the second set of SPS transmissions using the second configuration, where at least one of the first configuration or the second configuration is adjusted in accordance with the indication. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
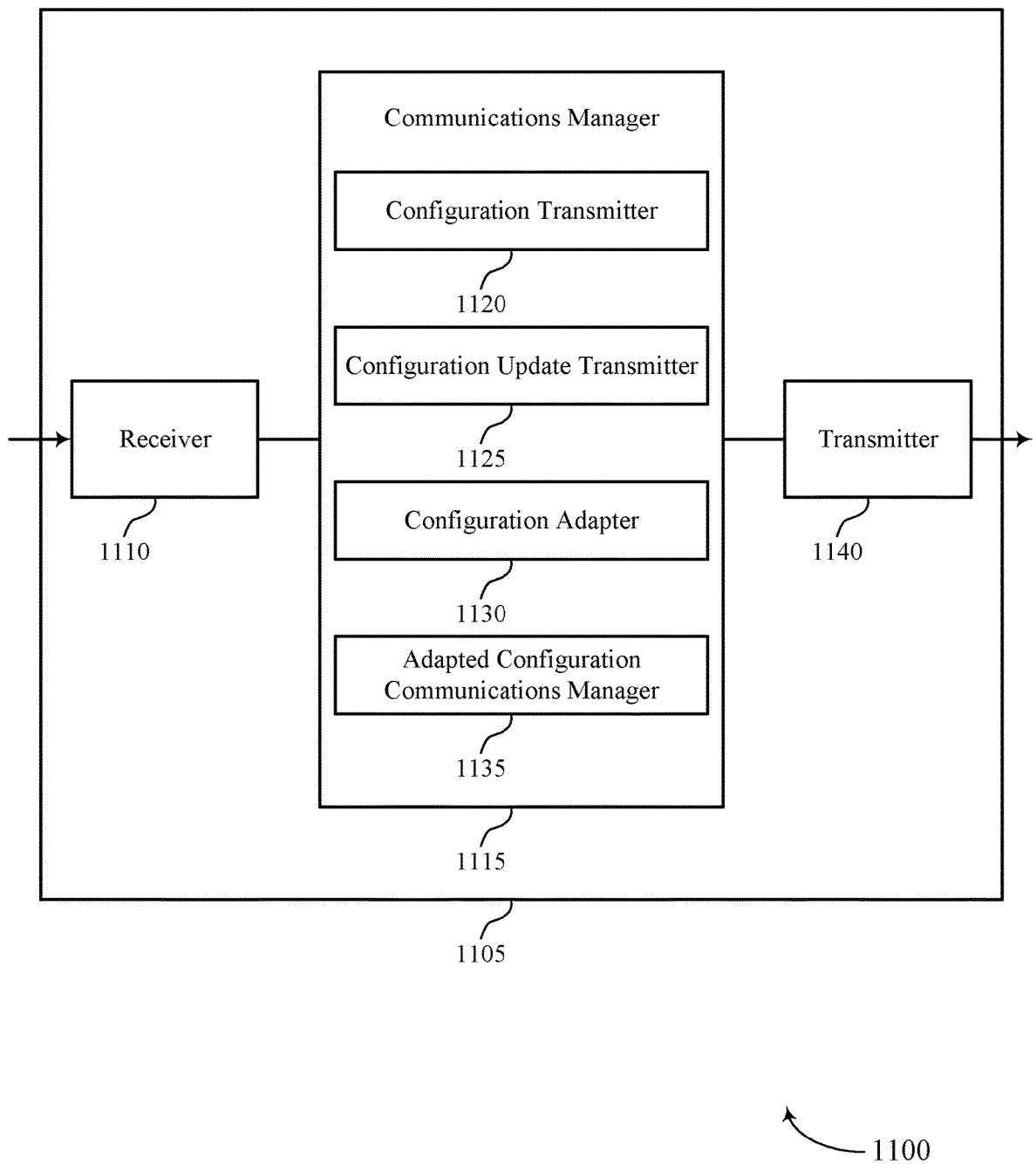

FIG. 11 shows a block diagram 1100 of a device 1105 that supports multiple autonomous transmission control by a single DCI message in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to multiple autonomous transmission control by a single DCI message, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a configuration transmitter 1120, a configuration update transmitter 1125, a configuration adapter 1130, and an adapted configuration communications manager 1135. The communications manager 1115 may be an example of aspects of the communications manager 1310 described herein.

The configuration transmitter 1120 may transmit, to a UE, a first configuration for a first set of SPS transmissions with the base station and a second configuration for a second set of SPS transmissions with the base station.

The configuration update transmitter 1125 may transmit, to the UE, an indication within a DCI message that identifies both the first configuration and the second configuration and indicates that at least one of the first configuration and the second configuration is to be updated. The configuration adapter 1130 may adjust at least one of the first configuration and the second configuration according to the indication included within the DCI message.

The adapted configuration communications manager 1135 may communicate with the UE via the first set of SPS transmissions using the first configuration and via the second set of SPS transmissions using the second configuration, where at least one of the first configuration or the second configuration is adjusted in accordance with the indication.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
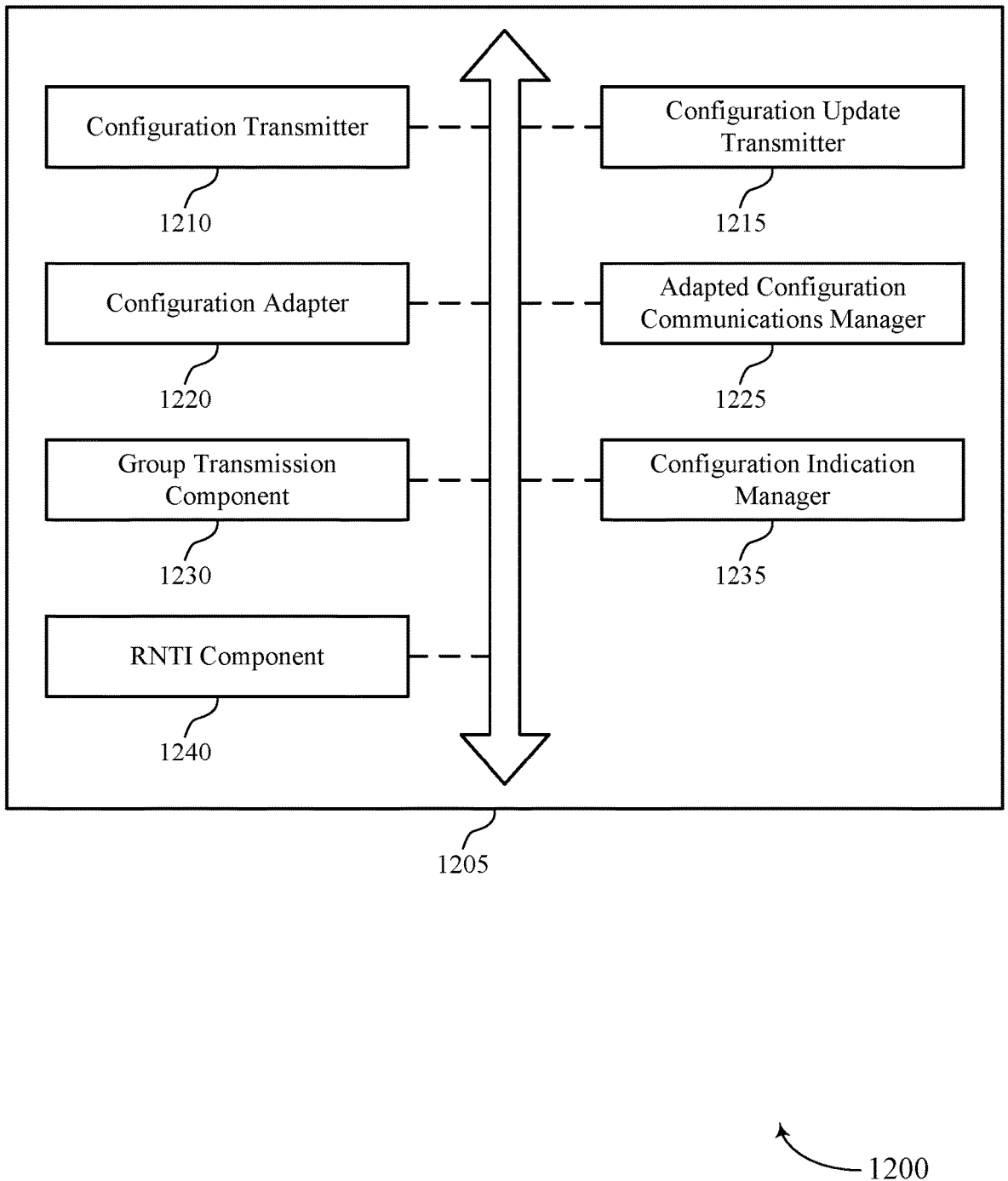
FIG. 12 shows a block diagram of a communications manager that supports multiple autonomous transmission control by a single DCI message in accordance with aspects of the present disclosure.

FIG. 12 shows a block diagram 1200 of a communications manager 1205 that supports multiple autonomous transmission control by a single DCI message in accordance with aspects of the present disclosure. The communications manager 1205 may be an example of aspects of a communications manager 1015, a communications manager 1115, or a communications manager 1310 described herein. The communications manager 1205 may include a configuration transmitter 1210, a configuration update transmitter 1215, a configuration adapter 1220, an adapted configuration communications manager 1225, a group transmission component 1230, a configuration indication manager 1235, and a RNTI component 1240. Each of these modules may communicate, directly or indirectly, with one another (e.g., via one or more buses).

The configuration transmitter 1210 may transmit, to a UE, a first configuration for a first set of SPS transmissions with the base station and a second configuration for a second set of SPS transmissions with the base station. In some cases, a configuration for a set of SPS transmissions is indicative of one or more of a set of resource blocks, a time offset, a periodicity, or a MCS associated with the set of SPS transmissions.

The configuration update transmitter 1215 may transmit, to the UE, an indication within a DCI message that identifies both the first configuration and the second configuration and indicates that at least one of the first configuration and the second configuration is to be updated. In some examples, the configuration update transmitter 1215 may transmit a bitmap which indicates updates to the first configuration and the second configuration. In some examples, the configuration update transmitter 1215 may transmit, in the DCI message, a first indication and a corresponding first identifier associated with the first configuration. In some examples, the configuration update transmitter 1215 may transmit, in the DCI message, a second indication and a corresponding second identifier associated with the second configuration. In some examples, the configuration update transmitter 1215 may transmit a first reconfiguration indication within a first field of the DCI message. In some examples, the configuration update transmitter 1215 may transmit a second reconfiguration message within a second field of the DCI message that is different from the first field. In some examples, the configuration update transmitter 1215 may transmit a single reconfiguration indication within a field of the DCI message which indicates updates to the first configuration and the second configuration. In some examples, the configuration update transmitter 1215 may transmit the DCI message via a physical downlink control channel.

The configuration adapter 1220 may adjust at least one of the first configuration and the second configuration according to the indication included within the DCI message.

The adapted configuration communications manager 1225 may communicate with the UE via the first set of SPS transmissions using the first configuration and via the second set of SPS transmissions using the second configuration, where at least one of the first configuration or the second configuration is adjusted in accordance with the indication.

The group transmission component 1230 may transmit, to the UE, a grouping indication that indicates that the first set of SPS transmissions and the second set of SPS transmissions are in a configuration group, where the indication that identifies both the first configuration and the second configuration indicates that both the first configuration and the second configuration are to be updated based on the first set of SPS transmissions and the second set of SPS transmissions being in a same configuration group.

The configuration indication manager 1235 may transmit the value within the indication, where the value is an updated base time offset. In some cases, the indication includes a value by which both the first configuration and the second configuration are to be adjusted.

In some examples, the configuration indication manager 1235 may adapt a first time offset corresponding to the first set of SPS transmissions by adding the updated base time offset to an initial first time offset associated with the first configuration. In some examples, the configuration indication manager 1235 may adapt a second time offset corresponding to the second set of SPS transmissions by adding the updated base time offset to an initial second time offset associated with the second configuration.

In some examples, the configuration indication manager 1235 may transmit the value from the indication, where the value is an updated base frequency offset. In some examples, the configuration indication manager 1235 may adapt a first frequency offset corresponding to the first set of SPS transmissions by adding the updated base frequency offset to an initial first frequency offset associated with the first configuration. In some examples, the configuration indication manager 1235 may adapt a second frequency offset corresponding to the second set of SPS transmissions by adding the updated base frequency offset to an initial second frequency offset associated with the second configuration.

In some examples, the configuration indication manager 1235 may transmit the value from the indication, where the value is an updated base bandwidth allocation. In some examples, the configuration indication manager 1235 may adapt a first bandwidth allocation corresponding to the first set of SPS transmissions by adding the updated base bandwidth allocation to an initial first bandwidth allocation associated with the first configuration. In some examples, the configuration indication manager 1235 may adapt a second bandwidth allocation corresponding to the second set of SPS transmissions by adding the updated base bandwidth allocation to an initial second bandwidth allocation associated with the second configuration.

In some examples, the configuration indication manager 1235 may transmit the value from the indication, where the value is an updated MCS indication. In some examples, the configuration indication manager 1235 may adapt a first MCS corresponding to the first set of SPS transmissions by adding the updated MCS indication to an initial MCS indication associated with the first configuration. In some examples, the configuration indication manager 1235 may adapt a second MCS corresponding to the second set of SPS transmissions by adding the updated MCS indication to an initial MCS indication associated with the second configuration.

The RNTI component 1240 may scramble the DCI message using a group radio network temporary identifier, where using the group radio network temporary identifier to scramble the DCI message indicates that the DCI message includes the indication that identifies both the first configuration and the second configuration and indicates that at least one of the first configuration and the second configuration is to be updated. In some examples, the RNTI component 1240 may determine the group radio network temporary identifier as a function of a first radio network temporary identifier and a second radio network temporary identifier. In some examples, the RNTI component 1240 may transmit the first radio network temporary identifier with the first configuration. In some examples, the RNTI component 1240 may transmit the second radio network temporary identifier with the second configuration. In some examples, the RNTI component 1240 may select the group radio network temporary identifier from the one or more radio network temporary identifiers. In some examples, the RNTI component 1240 may transmit, with either the first configuration or the second configuration, one or more radio network temporary identifiers. In some cases, the group radio network temporary identifier is a cell radio network temporary identifier.

Figure 13:
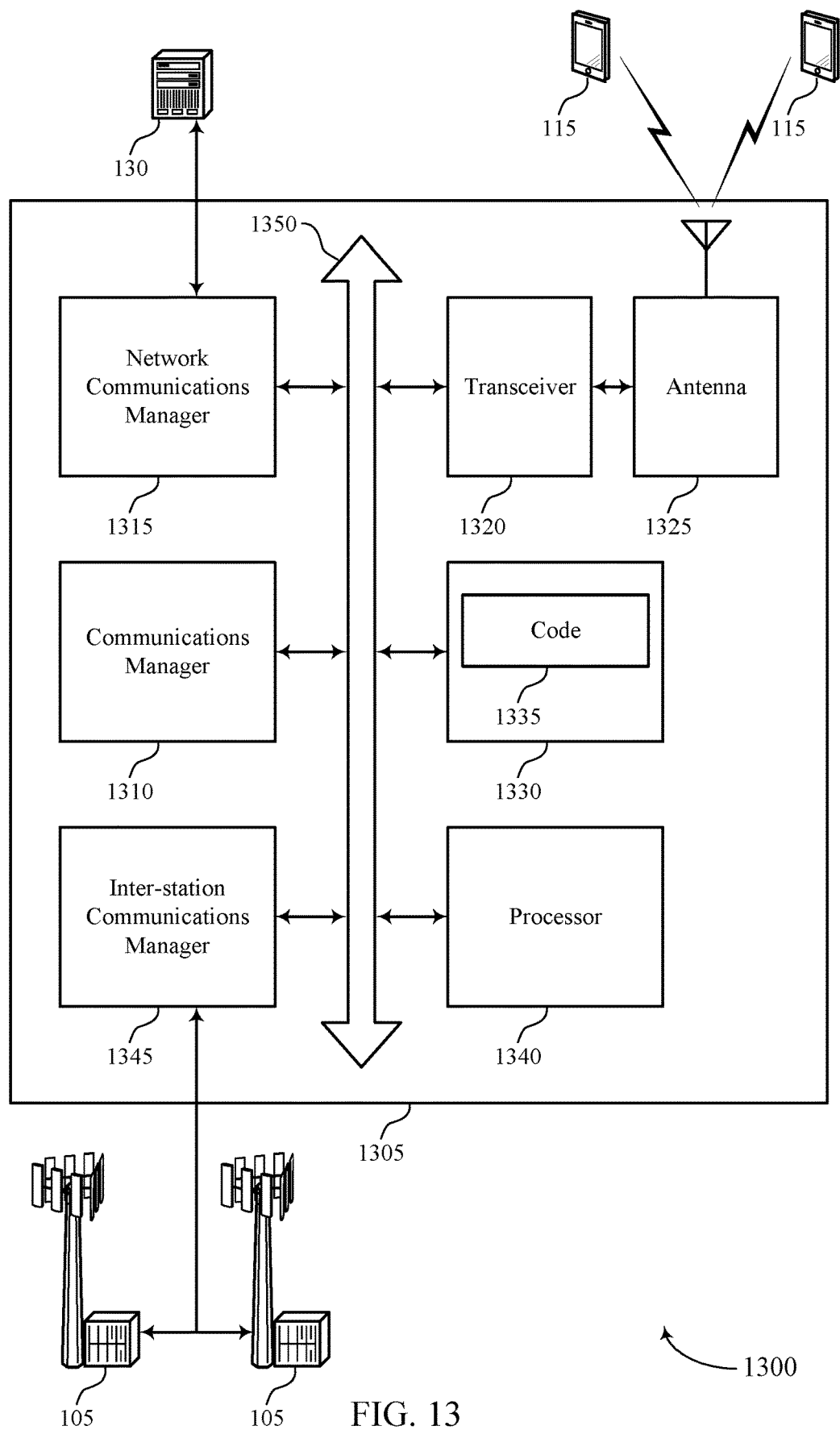
FIG. 13 shows a diagram of a system including a device that supports multiple autonomous transmission control by a single DCI message in accordance with aspects of the present disclosure.

FIG. 13 shows a diagram of a system 1300 including a device 1305 that supports multiple autonomous transmission control by a single DCI message in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be coupled via one or more buses (e.g., bus 1350).

The communications manager 1310 may transmit, to a UE, a first configuration for a first set of SPS transmissions with the base station and a second configuration for a second set of SPS transmissions with the base station, transmit, to the UE, an indication within a DCI message that identifies both the first configuration and the second configuration and indicates that at least one of the first configuration and the second configuration is to be updated, adjust at least one of the first configuration and the second configuration according to the indication included within the DCI message, and communicate with the UE via the first set of SPS transmissions using the first configuration and via the second set of SPS transmissions using the second configuration, where at least one of the first configuration or the second configuration is adjusted in accordance with the indication.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting multiple autonomous transmission control by a single DCI message).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
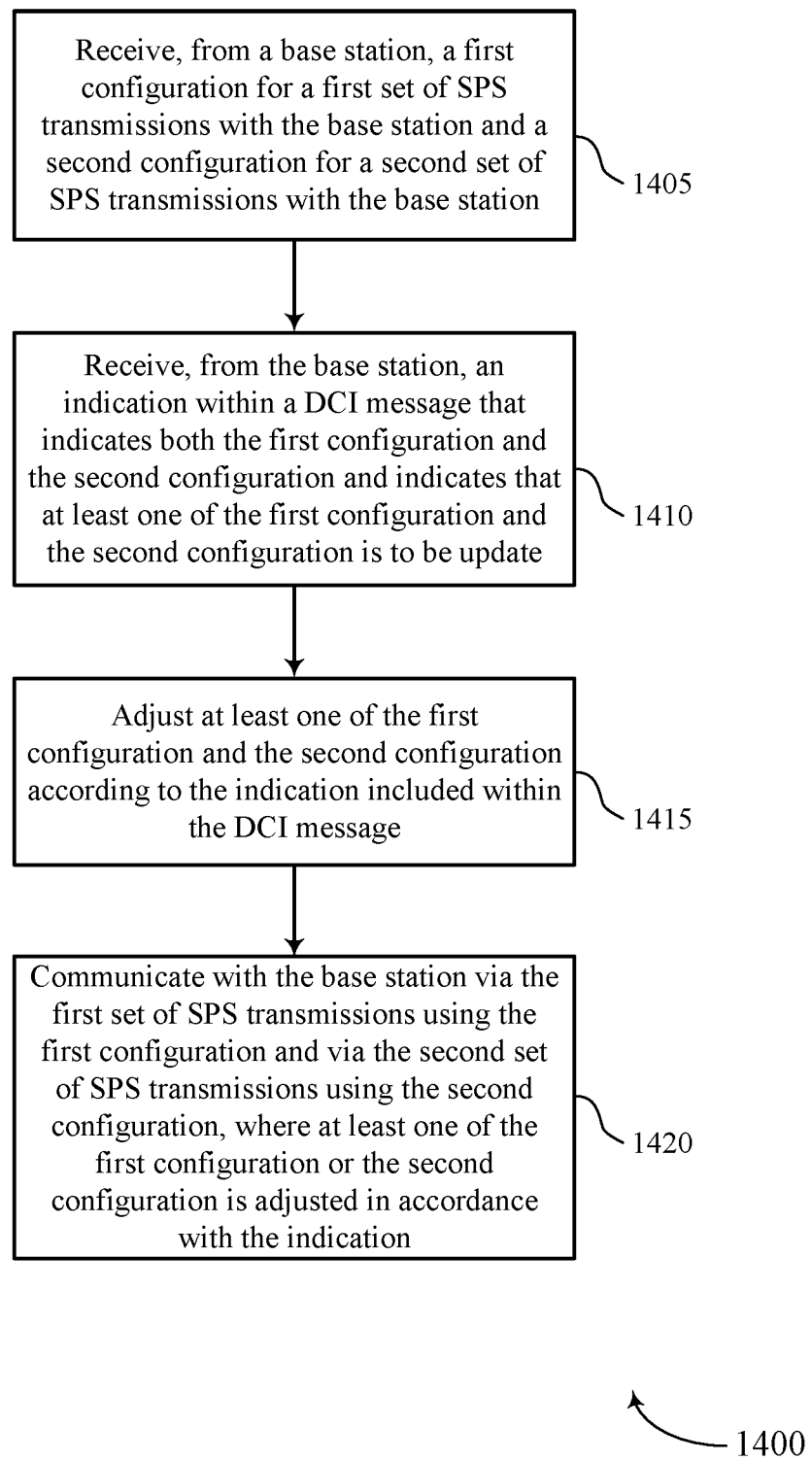
FIGS. 14 through 17 show flowcharts illustrating methods that support multiple autonomous transmission control by a single DCI message in accordance with aspects of the present disclosure.

FIG. 14 shows a flowchart illustrating a method 1400 that supports multiple autonomous transmission control by a single DCI message in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a base station, a first configuration for a first set of SPS transmissions with the base station and a second configuration for a second set of SPS transmissions with the base station. The operations of 1405 may be performed according to the methods described herein. In some examples, aspects of the operations of 1405 may be performed by a received configuration manager as described with reference to FIGS. 6 through 9.

At 1410, the UE may receive, from the base station, an indication within a DCI message that indicates both the first configuration and the second configuration and indicates that at least one of the first configuration and the second configuration is to be updated. The operations of 1410 may be performed according to the methods described herein. In some examples, aspects of the operations of 1410 may be performed by a configuration update component as described with reference to FIGS. 6 through 9.

At 1415, the UE may adjust at least one of the first configuration and the second configuration according to the indication included within the DCI message. The operations of 1415 may be performed according to the methods described herein. In some examples, aspects of the operations of 1415 may be performed by a configuration adjuster as described with reference to FIGS. 6 through 9.

At 1420, the UE may communicate with the base station via the first set of SPS transmissions using the first configuration and via the second set of SPS transmissions using the second configuration, where at least one of the first configuration or the second configuration is adjusted in accordance with the indication. The operations of 1420 may be performed according to the methods described herein. In some examples, aspects of the operations of 1420 may be performed by an adjusted communications manager as described with reference to FIGS. 6 through 9.

Figure 15:
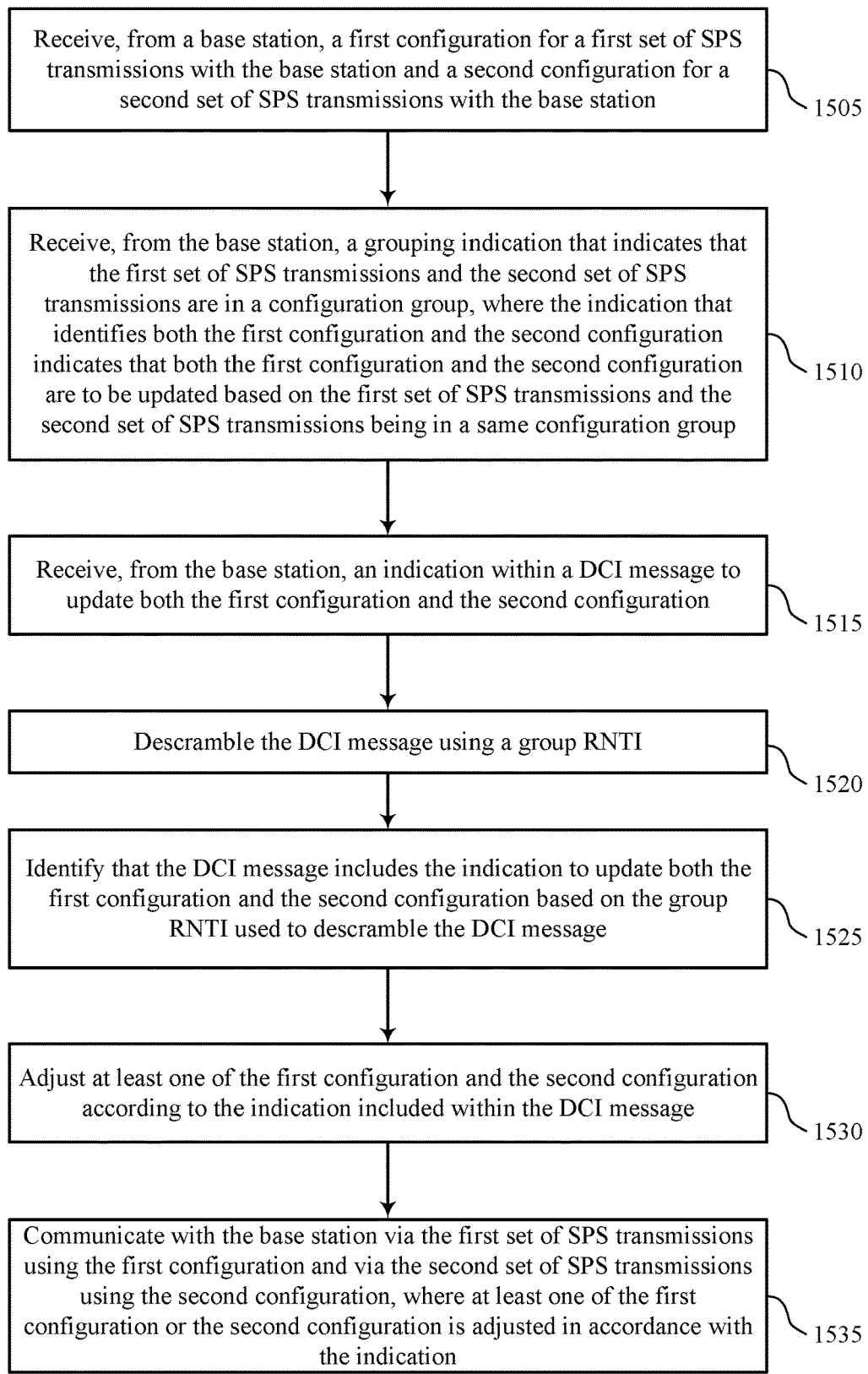

FIG. 15 shows a flowchart illustrating a method 1500 that supports multiple autonomous transmission control by a single DCI message in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, a first configuration for a first set of SPS transmissions with the base station and a second configuration for a second set of SPS transmissions with the base station. The operations of 1505 may be performed according to the methods described herein. In some examples, aspects of the operations of 1505 may be performed by a received configuration manager as described with reference to FIGS. 6 through 9.

At 1510, the UE may receive, from the base station, a grouping indication that indicates that the first set of SPS transmissions and the second set of SPS transmissions are in a configuration group, where the indication that identifies both the first configuration and the second configuration indicates that both the first configuration and the second configuration are to be updated based on the first set of SPS transmissions and the second set of SPS transmissions being in a same configuration group. The operations of 1510 may be performed according to the methods described herein. In some examples, aspects of the operations of 1510 may be performed by a grouping component as described with reference to FIGS. 6 through 9.

At 1515, the UE may receive, from the base station, an indication within a DCI message to update that identifies both the first configuration and the second configuration and indicates that at least one of the first configuration and the second configuration is to be updated. The operations of 1515 may be performed according to the methods described herein. In some examples, aspects of the operations of 1515 may be performed by a configuration update component as described with reference to FIGS. 6 through 9.

At 1520, the UE may descramble the DCI message using a group radio network temporary identifier. The operations of 1520 may be performed according to the methods described herein. In some examples, aspects of the operations of 1520 may be performed by a RNTI manager as described with reference to FIGS. 6 through 9.

At 1525, the UE may identify that the DCI message includes the indication identifying both the first configuration and the second configuration based on the group radio network temporary identifier used to descramble the DCI message. The operations of 1525 may be performed according to the methods described herein. In some examples, aspects of the operations of 1525 may be performed by a RNTI manager as described with reference to FIGS. 6 through 9.

At 1530, the UE may adjust at least one of the first configuration and the second configuration according to the indication included within the DCI message. The operations of 1530 may be performed according to the methods described herein. In some examples, aspects of the operations of 1530 may be performed by a configuration adjuster as described with reference to FIGS. 6 through 9.

At 1535, the UE may communicate with the base station via the first set of SPS transmissions using the first configuration and via the second set of SPS transmissions using the second configuration, where at least one of the first configuration or the second configuration is adjusted in accordance with the indication. The operations of 1535 may be performed according to the methods described herein. In some examples, aspects of the operations of 1535 may be performed by an adjusted communications manager as described with reference to FIGS. 6 through 9.

Figure 16:
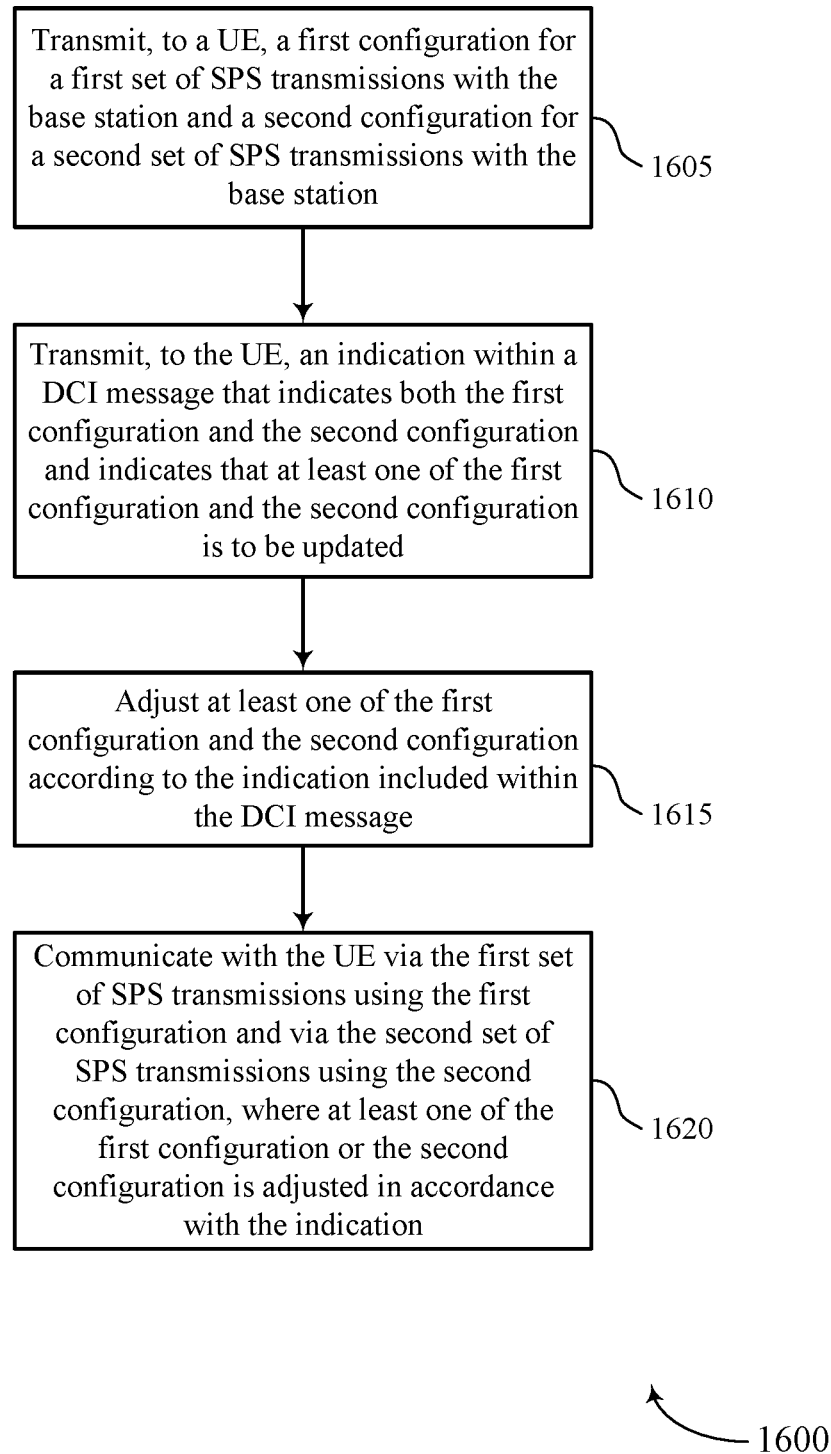

FIG. 16 shows a flowchart illustrating a method 1600 that supports multiple autonomous transmission control by a single DCI message in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1605, the base station may transmit, to a UE, a first configuration for a first set of SPS transmissions with the base station and a second configuration for a second set of SPS transmissions with the base station. The operations of 1605 may be performed according to the methods described herein. In some examples, aspects of the operations of 1605 may be performed by a configuration transmitter as described with reference to FIGS. 10 through 13.

At 1610, the base station may transmit, to the UE, an indication within a DCI message that identifies both the first configuration and the second configuration and indicates that at least one of the first configuration and the second configuration is to be updated. The operations of 1610 may be performed according to the methods described herein. In some examples, aspects of the operations of 1610 may be performed by a configuration update transmitter as described with reference to FIGS. 10 through 13.

At 1615, the base station may adjust at least one of the first configuration and the second configuration according to the indication included within the DCI message. The operations of 1615 may be performed according to the methods described herein. In some examples, aspects of the operations of 1615 may be performed by a configuration adapter as described with reference to FIGS. 10 through 13.

At 1620, the base station may communicate with the UE via the first set of SPS transmissions using the first configuration and via the second set of SPS transmissions using the second configuration, where at least one of the first configuration or the second configuration is adjusted in accordance with the indication. The operations of 1620 may be performed according to the methods described herein. In some examples, aspects of the operations of 1620 may be performed by an adapted configuration communications manager as described with reference to FIGS. 10 through 13.

Figure 17:
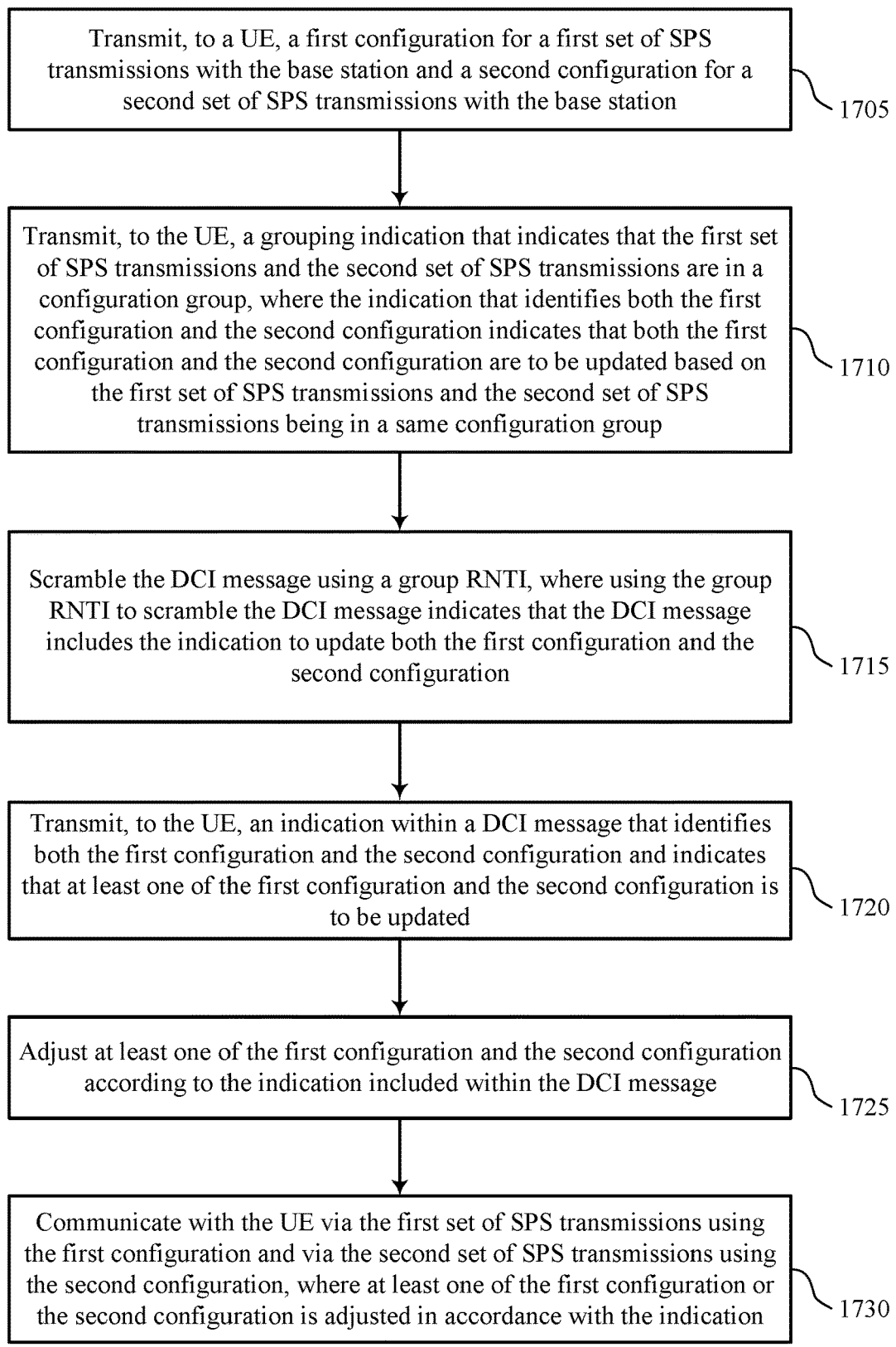

FIG. 17 shows a flowchart illustrating a method 1700 that supports multiple autonomous transmission control by a single DCI message in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may transmit, to a UE, a first configuration for a first set of SPS transmissions with the base station and a second configuration for a second set of SPS transmissions with the base station. The operations of 1705 may be performed according to the methods described herein. In some examples, aspects of the operations of 1705 may be performed by a configuration transmitter as described with reference to FIGS. 10 through 13.

At 1710, the base station may transmit, to the UE, a grouping indication that indicates that the first set of SPS transmissions and the second set of SPS transmissions are in a configuration group, where the indication that identifies both the first configuration and the second configuration indicates that both the first configuration and the second configuration are to be updated based on the first set of SPS transmissions and the second set of SPS transmissions being in a same configuration group. The operations of 1710 may be performed according to the methods described herein. In some examples, aspects of the operations of 1710 may be performed by a group transmission component as described with reference to FIGS. 10 through 13.

At 1715, the base station may scramble the DCI message using a group radio network temporary identifier, where using the group radio network temporary identifier to scramble the DCI message indicates that the DCI message includes the indication identifying both the first configuration and the second configuration. The operations of 1715 may be performed according to the methods described herein. In some examples, aspects of the operations of 1715 may be performed by a RNTI component as described with reference to FIGS. 10 through 13.

At 1720, the base station may transmit, to the UE, an indication within a DCI message that identifies both the first configuration and the second configuration and indicates that at least one of the first configuration and the second configuration is to be updated. The operations of 1720 may be performed according to the methods described herein. In some examples, aspects of the operations of 1720 may be performed by a configuration update transmitter as described with reference to FIGS. 10 through 13.

At 1725, the base station may adjust at least one of the first configuration and the second configuration according to the indication included within the DCI message. The operations of 1725 may be performed according to the methods described herein. In some examples, aspects of the operations of 1725 may be performed by a configuration adapter as described with reference to FIGS. 10 through 13.

At 1730, the base station may communicate with the UE via the first set of SPS transmissions using the first configuration and via the second set of SPS transmissions using the second configuration, where at least one of the first configuration or the second configuration is adjusted in accordance with the indication. The operations of 1730 may be performed according to the methods described herein. In some examples, aspects of the operations of 1730 may be performed by an adapted configuration communications manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

receiving, from a base station, a first configuration for a first set of semi-persistent scheduled (SPS) transmissions with the base station and a second configuration for a second set of SPS transmissions with the base station;

receiving, from the base station, an indication within a downlink control information message that identifies both the first configuration and the second configuration and indicates that one or more parameters of at least one of the first configuration for the first set of SPS transmissions and the second configuration for the second set of SPS transmissions are to be updated;

adjusting at least one of the first configuration and the second configuration according to the indication included within the downlink control information message; and communicating with the base station via the first set of SPS transmissions using the first configuration and via the second set of SPS transmissions using the second configuration, wherein at least one of the first configuration or the second configuration is adjusted in accordance with the indication.

2. The method of claim 1, further comprising:
receiving, from the base station, a grouping indication that indicates that the first set of SPS transmissions and the second set of SPS transmissions are in a configuration group, wherein the indication that identifies both the first configuration and the second configuration indicates that both the first configuration and the second configuration are to be updated based at least in part on the first set of SPS transmissions and the second set of SPS transmissions being in a same configuration group.

3. The method of claim 1, wherein receiving the indication with the downlink control information message comprises:
receiving a bitmap which indicates updates to the first configuration and the second configuration.

4. The method of claim 1, wherein receiving the indication with the downlink control information message comprises:
receiving, in the downlink control information message, a first indication and a corresponding first identifier associated with the first configuration; and
receiving, in the downlink control information message, a second indication and a corresponding second identifier associated with the second configuration.

5. The method of claim 1, wherein receiving the indication with the downlink control information message comprises:
receiving a first reconfiguration indication within a first field of the downlink control information message; and
receiving a second reconfiguration message within a second field of the downlink control information message that is different from the first field.

6. The method of claim 1, wherein receiving the indication with the downlink control information message comprises:
receiving a single reconfiguration indication within a field of the downlink control information message which indicates updates to the first configuration and the second configuration.

7. The method of claim 1, further comprising:
deactivating at least one of the first configuration and the second configuration according to the indication, wherein the adjusting is based at least in part on deactivating at least one of the first configuration and the second configuration.

8. The method of claim 1, wherein the indication includes a value by which both the first configuration and the second configuration are to be adjusted.

9. The method of claim 8, further comprising:
identifying the value from the indication, wherein the value is an updated base time offset;
adapting a first time offset corresponding to the first set of SPS transmissions by adding the updated base time offset to an initial first time offset associated with the first configuration; and
adapting a second time offset corresponding to the second set of SPS transmissions by adding the updated base time offset to an initial second time offset associated with the second configuration.

10. The method of claim 8, further comprising:
identifying the value from the indication, wherein the value is an updated base frequency offset;
adapting a first frequency offset corresponding to the first set of SPS transmissions by adding the updated base frequency offset to an initial first frequency offset associated with the first configuration; and
adapting a second frequency offset corresponding to the second set of SPS transmissions by adding the updated base frequency offset to an initial second frequency offset associated with the second configuration.

11. The method of claim 8, further comprising:
identifying the value from the indication, wherein the value is an updated base bandwidth allocation;
adapting a first bandwidth allocation corresponding to the first set of SPS transmissions by adding the updated base bandwidth allocation to an initial first bandwidth allocation associated with the first configuration; and
adapting a second bandwidth allocation corresponding to the second set of SPS transmissions by adding the updated base bandwidth allocation to an initial second bandwidth allocation associated with the second configuration.

12. The method of claim 8, further comprising:
identifying the value from the indication, wherein the value is an updated modulation and coding scheme indication;
adapting a first modulation and coding scheme corresponding to the first set of SPS transmissions by adding the updated modulation and coding scheme indication to an initial modulation and coding scheme indication associated with the first configuration; and
adapting a second modulation and coding scheme corresponding to the second set of SPS transmissions by adding the updated modulation and coding scheme indication to an initial modulation and coding scheme indication associated with the second configuration.

13. The method of claim 1, further comprising:
descrambling the downlink control information message using a group radio network temporary identifier; and
identifying that the downlink control information message includes the indication that identifies both the first configuration and the second configuration based at least in part on the group radio network temporary identifier used to descramble the downlink control information message.

14. The method of claim 13, wherein the group radio network temporary identifier is a cell radio network temporary identifier.

15. The method of claim 13, further comprising:
receiving a first radio network temporary identifier with the first configuration;
receiving a second radio network temporary identifier with the second configuration; and
determining the group radio network temporary identifier as a function of the first radio network temporary identifier and the second radio network temporary identifier.

16. The method of claim 13, further comprising:
receiving, with the first configuration and the second configuration, one or more radio network temporary identifiers; and
selecting the group radio network temporary identifier from the one or more radio network temporary identifiers.

17. The method of claim 1, wherein a configuration for a set of SPS transmissions is indicative of one or more of a set of resource blocks, a time offset, a periodicity, or a modulation and coding scheme associated with the set of SPS transmissions.

18. The method of claim 1, wherein receiving the indication within the downlink control information message further comprises:
receiving the downlink control information message via a physical downlink control channel.

19. A method for wireless communication at a base station, comprising:
transmitting, to a user equipment (UE), a first configuration for a first set of semi-persistent scheduled (SPS) transmissions with the base station and a second configuration for a second set of SPS transmissions with the base station;
transmitting, to the UE, an indication within a downlink control information message that identifies both the first configuration and the second configuration and indicates that one or more parameters of at least one of the first configuration for the first set of SPS transmissions and the second configuration for the second set of SPS transmissions are to be updated;
adjusting at least one of the first configuration and the second configuration according to the indication included within the downlink control information message; and
communicating with the UE via the first set of SPS transmissions using the first configuration and via the second set of SPS transmissions using the second configuration, wherein at least one of the first configuration or the second configuration is adjusted in accordance with the indication.

20. The method of claim 19, further comprising:
transmitting, to the UE, a grouping indication that indicates that the first set of SPS transmissions and the second set of SPS transmissions are in a configuration group, wherein the indication that identifies both the first configuration and the second configuration indicates that both the first configuration and the second configuration are to be updated based at least in part on the first set of SPS transmissions and the second set of SPS transmissions being in a same configuration group.

21. The method of claim 19, wherein transmitting the indication with the downlink control information message comprises:
transmitting a bitmap which indicates updates to the first configuration and the second configuration.

22. The method of claim 19, wherein transmitting the indication with the downlink control information message comprises:
transmitting a first reconfiguration indication within a first field of the downlink control information message; and
transmitting a second reconfiguration message within a second field of the downlink control information message that is different from the first field.

23. The method of claim 19, wherein transmitting the indication with the downlink control information message comprises:
transmitting a single reconfiguration indication within a field of the downlink control information message which indicates updates to the first configuration and the second configuration.

24. The method of claim 19, wherein the indication includes a value by which both the first configuration and the second configuration are to be adjusted.

25. The method of claim 19, further comprising:
scrambling the downlink control information message using a group radio network temporary identifier, wherein using the group radio network temporary identifier to scramble the downlink control information message indicates that the downlink control information message includes the indication that identifies both the first configuration and the second configuration.

26. The method of claim 25, further comprising:
determining the group radio network temporary identifier as a function of a first radio network temporary identifier and a second radio network temporary identifier;
transmitting the first radio network temporary identifier with the first configuration; and
transmitting the second radio network temporary identifier with the second configuration.

27. The method of claim 25, further comprising:
selecting the group radio network temporary identifier from one or more radio network temporary identifiers; and
transmitting, with either the first configuration or the second configuration, the one or more radio network temporary identifiers.

28. The method of claim 19, wherein a configuration for a set of SPS transmissions is indicative of one or more of a set of resource blocks, a time offset, a periodicity, or a modulation and coding scheme associated with the set of SPS transmissions.

29. An apparatus for wireless communication at a user equipment (UE), comprising: a processor, memory coupled with the processor; and instructions stored in the memory and executable by the processor to cause the apparatus to:
receive, from a base station, a first configuration for a first set of semi-persistent scheduled (SPS) transmissions with the base station and a second configuration for a second set of SPS transmissions with the base station;
receive, from the base station, an indication within a downlink control information message that identifies both the first configuration and the second configuration and indicates that one or more parameters of at least one of the first configuration for the first set of SPS transmissions and the second configuration for the second set of SPS transmissions are to be updated;
adjust at least one of the first configuration and the second configuration according to the indication included within the downlink control information message; and
communicate with the base station via the first set of SPS transmissions using the first configuration and via the second set of SPS transmissions using the second configuration, wherein at least one of the first configuration or the second configuration is adjusted in accordance with the indication.

30. An apparatus for wireless communication at a base station, comprising: a processor, memory coupled with the processor; and instructions stored in the memory and executable by the processor to cause the apparatus to:
transmit, to a user equipment (UE), a first configuration for a first set of semi-persistent scheduled (SPS) transmissions with the base station and a second configuration for a second set of SPS transmissions with the base station;
transmit, to the UE, an indication within a downlink control information message that identifies both the first configuration and the second configuration and indicates that one or more parameters of at least one of the first configuration for the first set of SPS transmissions and the second configuration for the second set of SPS transmissions are to be updated;

adjust at least one of the first configuration and the second configuration according to the indication included within the downlink control information message; and
communicate with the UE via the first set of SPS transmissions using the first configuration and via the second set of SPS transmissions using the second configuration, wherein at least one of the first configuration or the second configuration is adjusted in accordance with the indication.

* * * * *